(12) United States Patent
Zhou et al.

(10) Patent No.: US 12,486,687 B2
(45) Date of Patent: Dec. 2, 2025

(54) POOL-CLEANING ROBOT

(71) Applicant: Chasing-Innovation Technology Co., Ltd., Shenzhen (CN)

(72) Inventors: Changgen Zhou, Shenzhen (CN); Chaomin Chen, Shenzhen (CN); Guofeng Zhong, Shenzhen (CN)

(73) Assignee: Chasing-Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/739,275

(22) Filed: Jun. 10, 2024

(65) Prior Publication Data

US 2025/0327325 A1 Oct. 23, 2025

Related U.S. Application Data

(63) Continuation of application No. PCT/CN2024/088922, filed on Apr. 19, 2024.

(30) Foreign Application Priority Data

Apr. 16, 2024 (CN) .......................... 202410458866.0

(51) Int. Cl.
E04H 4/16 (2006.01)
A61L 2/10 (2006.01)
(Continued)

(52) U.S. Cl.
CPC .............. *E04H 4/1654* (2013.01); *A61L 2/10* (2013.01); *A61L 2/24* (2013.01); *A61L 2/26* (2013.01);
(Continued)

(58) Field of Classification Search
CPC . E04H 4/1654; A61L 2/10; A61L 2/24; A61L 2/26; A61L 2202/11;
(Continued)

(56) References Cited

U.S. PATENT DOCUMENTS

2015/0275537 A1 10/2015 Witelson et al.

FOREIGN PATENT DOCUMENTS

CN 202229134 U 5/2012
CN 110510790 A 11/2019
(Continued)

OTHER PUBLICATIONS

Office Action Dated Jan. 26, 2025 for Corresponding Chinese Patent Application No. 202410458866.0.
(Continued)

*Primary Examiner* — Tom Rodgers

(57) ABSTRACT

A pool-cleaning robot includes a housing defining a receiving chamber therein, a power assembly connected to the housing, as well as a filter assembly, a pump assembly and a germicidal lamp assembly which are accommodated in the housing. The housing defines a water inlet and a water outlet which are fluidly communicated with one another. The power assembly is configured to drive the pool-cleaning robot to travel in a pool. The filter assembly has a filter chamber that is in fluid communication with the water inlet and the water outlet. The pump assembly is configured to drive the water flowing into the receiving chamber from the water inlet and then out from the water outlet after being filtered by the filter assembly. The germicidal lamp assembly is arranged adjacent to the filter assembly or in a flow channel between the water inlet and the filter assembly.

20 Claims, 15 Drawing Sheets

(51) Int. Cl.
    *A61L 2/24*     (2006.01)
    *A61L 2/26*     (2006.01)
    *B01D 29/33*     (2006.01)
    *C02F 1/00*     (2023.01)
    *C02F 1/32*     (2023.01)
    *C02F 103/42*     (2006.01)

(52) U.S. Cl.
    CPC .............. *B01D 29/33* (2013.01); *C02F 1/001* (2013.01); *C02F 1/325* (2013.01); *A61L 2202/11* (2013.01); *A61L 2202/14* (2013.01); *A61L 2202/16* (2013.01); *A61L 2202/17* (2013.01); *C02F 2103/42* (2013.01); *C02F 2201/006* (2013.01); *C02F 2201/008* (2013.01); *C02F 2201/3228* (2013.01); *C02F 2201/326* (2013.01); *C02F 2303/04* (2013.01); *C02F 2303/14* (2013.01)

(58) Field of Classification Search
    CPC .............. A61L 2202/14; A61L 2202/16; A61L 2202/17; B01D 29/33; C02F 1/001; C02F 1/325; C02F 2103/42; C02F 2201/006; C02F 2201/008; C02F 2201/3228; C02F 2201/326; C02F 2303/04; C02F 2303/14
    See application file for complete search history.

(56) References Cited

FOREIGN PATENT DOCUMENTS

| | | | |
|---|---|---|---|
| CN | 212713077 U | 3/2021 | |
| CN | 114278129 A | 4/2022 | |
| CN | 219604976 U | 8/2023 | |
| CN | 116950469 A | 10/2023 | |
| CN | 117403943 A | 1/2024 | |
| CN | 118327359 A | 7/2024 | |
| WO | WO2007136831 A2 * | 11/2007 | ........... E04H 4/1209 |
| WO | WO2021100033 A1 * | 5/2021 | ........... E04H 4/1654 |

OTHER PUBLICATIONS

Office Action Dated Apr. 7, 2025 for Corresponding Chinese Patent Application No. 202410458866.0.

International Search Report Dated Jan. 3, 2025 for Corresponding PCT Application No. PCT/CN2024/088922.

Written Opinion of the International Searching Authority Dated Jan. 3, 2025 for Corresponding PCT Application No. PCT/CN2024/088922.

* cited by examiner

POOL-CLEANING ROBOT

CROSS-REFERENCE TO RELATED APPLICATIONS

The present application is a Continuation Application of PCT Application No. PCT/CN2024/088922, filed on Apr. 19, 2024, which claims the priority of Chinese Patent Application No. 202410458866.0, filed on Apr. 16, 2024, the entire contents of which are hereby incorporated by reference.

TECHNICAL FIELD

The present disclosure relates to the field of robot technology, specifically to a pool-cleaning robot.

DESCRIPTION OF THE PRIOR ART

With the development of robot technology for cleaning pools, the market has also placed heightened demands on it. For example, the germicidal lamps installed at the outlet or on the outer wall of the bottom of the robot body can not only achieve the objective of filtering and cleaning the pool water, but also sterilize and disinfect the pool water or pool walls. However, in actual use, it could be found that most of the contaminants in the water will accumulate on the filter assembly, and bacteria will also accumulate in large quantities on the surface of the filter. After passing through the filter assembly, the water is prone to secondary contamination when it flows back into the pool. On the other hand, the filter assembly generates odors due to the presence of large quantities of bacteria during usage, thereby affecting the customer experience.

SUMMARY OF THE DISCLOSURE

An objective of this disclosure is to provide a pool-cleaning robot to solve or mitigate the problems of secondary contamination and off-odor caused by the accumulated bacteria on the filter assembly in the prior art.

A pool-cleaning robot includes a housing defining a receiving chamber, a power assembly connected to the housing, as well as a filter assembly, a pump assembly and a germicidal lamp assembly which are accommodated in the housing. The power assembly is configured to provide power to drive the pool-cleaning robot to travel in the pool. The housing defines a water inlet and a water outlet which are fluidly communicated with one another. The filter assembly has a filter chamber that is in fluid communication with the water inlet and the water outlet. The pump assembly is configured to drive the water flowing into the receiving chamber from the water inlet and then out from the water outlet after being filtered by the filter assembly. The germicidal lamp assembly is arranged adjacent to the filter assembly for irradiating a surface of the filter assembly, or the germicidal lamp assembly is located in a flow channel between the water inlet and the filter assembly for irradiating the water after entering the housing but before filtration.

In some embodiments, the germicidal lamp assembly is disposed on an inner wall of the housing, and is located above, below and/or at a side of the filter assembly.

In some embodiments, the light-emitting direction of the germicidal lamp assembly is toward the filter assembly.

In some embodiments, the housing has an opening and a top cover covers the opening in a closable and openable manner, sealed installation space is defined between the top cover and a top of the filter assembly, and the germicidal lamp assembly is fixedly arranged in the installation space relative to the top cover.

In some embodiments, the housing includes an upper housing and a lower housing, the water inlet is defined on the lower housing, the germicidal lamp assembly is fixedly arranged on an inner wall of the lower housing, and the germicidal lamp assembly irradiates a bottom of the filter assembly.

In some embodiments, the bottom of the filter assembly is provided with an impurity collection bin, a bottom and/or side wall of the impurity collection bin is provided with a transparent plate, and the germicidal lamp assembly is arranged opposite to the transparent plate to irradiate an interior of the impurity collection bin.

In some embodiments, the germicidal lamp assembly is arranged at a periphery of the water inlet.

In some embodiments, wherein the germicidal lamp assembly is arranged on a side wall of the flow channel of the water inlet to irradiate the flow channel of the water inlet.

In some embodiments, a shape of the germicidal lamp assembly is substantially adapted to a shape of the water inlet.

In some embodiments, a number of water inlets is two, a number of germicidal lamp assemblies is also two, and the two germicidal lamp assemblies are respectively arranged on side walls of flow channels of the two water inlets, wherein, light-emitting directions of the two germicidal lamp assemblies are identical; or light-emitting directions of the two germicidal lamp assemblies are opposite to each other.

In some embodiments, the filter assembly is a basket filter device, the filter assembly includes a top plate, a bottom plate and a side wall connecting the top plate and the bottom plate, and the top plate, bottom plate and the side wall together define the filter chamber.

In some embodiments, the filter assembly further includes a middle partition located in the filter chamber, a top end of the middle partition abuts against the top plate, and a bottom end of the middle partition abuts against the bottom plate.

In some embodiments, the filter assembly is a cartridge filter device.

In some embodiments, the filter assembly is cylindrical, the bottom of the filter assembly is attached and conforms to the water inlet, and the germicidal lamp assembly is annular.

In some embodiments, a reflective material is provided on an inner wall of the housing at a position directly opposite to a light-emitting surface of the germicidal lamp assembly.

In some embodiments, the germicidal lamp assembly includes a light source module, a heat-dissipating seat and a lamp cover, the light source module is attached to a first side of the heat-dissipating seat, the lamp cover is connected to the first side of the heat-dissipating seat and encloses the light source module therein.

In some embodiments, the heat-dissipating seat includes a base and a plurality of heat-dissipating fins, the base has opposite first and second sides, and the light source module is arranged on the first side of the base, and the plurality of heat-dissipating fins are arranged on the second side of the base.

In some embodiments, a surface of the first side of the heat-dissipating seat is recessed inwardly to form an accommodation cavity, the light source module is accommodated in the accommodation cavity, and a perimeter of the lamp cover is connected to the heat-dissipating seat in a sealed manner.

In some embodiments, the lamp cover and the heat-dissipating seat are connected through a fastener; or the lamp cover is snapped on a periphery of the heat-dissipating seat.

In some embodiments, a material of an area of the lamp cover corresponding to the light source module is a transparent material, and a light-emitting surface of the lamp cover is provided with a protective film, which covers the transparent material of the lamp cover.

In some embodiments, the pool-cleaning robot further includes a control device electrically connected to the power assembly, the pump assembly and the germicidal lamp assembly, wherein the germicidal lamp assembly further comprises a power supply cable electrically connected to the control device, and the power supply cable is arranged along an inner wall of the housing.

Compared with the prior art, in the pool-cleaning robot according to embodiments of the present disclosure, by means of the germicidal lamp assembly arranged adjacent to the filter assembly for irradiating the surface thereof, or arranged in a flow channel between the water inlet and the filter assembly which irradiates the water entering into the housing but before filtration, the bacterial contaminates accumulated inside the filter assembly or the bacterial contaminates in the water before entering the filter assembly can be irradiated and disinfected. This reduces secondary contamination of the water passed through the filter assembly, avoids the problem of off-odor caused by bacteria in the filter assembly, and significantly enhances the hygiene level of the internal environment of the pool-cleaning robot, which not only improves germicidal efficiency but also greatly reduces the frequency of replacement and maintenance of the filter assembly, thereby achieving cost savings.

The second aspect of this disclosure further discloses an underwater germicidal lamp, which includes a base, a light source module fixed to the base, and a lamp cover enclosing the light source module. The light source module includes a substrate and a plurality of lamp beads disposed on the substrate, a bead area of the lamp cover corresponding to the light source module is a light-transmitting area, and a light-emitting surface of the light-transmitting area is provided with a removable covering film.

Compared with the prior art, in the underwater germicidal lamp according to embodiments of the present disclosure, the light-emitting surface of the light-transmitting area is equipped with the removable covering film. When a surface of the lamp cover of the underwater germicidal lamp hardens and adsorbs a layer of impurities due to long-term operation, the covering film is beneficial for isolating the impurities. During use, the covering film can be replaced regularly, i.e., by removing the old film and replacing it with a new one, which is easy to maintain. In this way, the light transmission variation in the light-transmitting area of the lamp cover can be reduced, thus ensuring the germicidal effect.

On the other hand, this disclosure further discloses a pool-cleaning robot with a germicidal lamp, including a housing defining a receiving chamber, a power assembly connected to the housing, as well as a filter assembly, a pump assembly and a germicidal lamp which are accommodated in the housing. The housing defines a water inlet and a water outlet which are in fluid communication. The power assembly is used to provide power to drive the pool-cleaning robot to travel in the pool. The filter assembly has a filter chamber that is in fluid communication with the water inlet and the water outlet. The pump assembly is used to drive the water flowing into the receiving chamber from the water inlet and then out from the water outlet after being filtered by the filter assembly. An inner wall of the housing is provided with a reflective layer at a position directly opposite to a light-emitting surface of the germicidal lamp.

Compared with the prior technology, the pool-cleaning robot according to embodiments of the present disclosure has a germicidal lamp, and the reflective layer is arranged on the inner wall of the housing at the position directly opposite to the light-emitting surface of the germicidal lamp. On the one hand, the configuration of the reflective layer can enhance the germicidal effect, and on the other hand, in the case where the housing is made of plastic, it can avoid the aging of the housing due to long-term irradiation by the germicidal lamp.

BRIEF DESCRIPTION OF DRAWINGS

To illustrate the technical solution of the embodiments of the present disclosure more clearly, the drawings used in embodiments or the prior art are briefly described below. Apparently, the drawings in the following description are some embodiments of the present disclosure, and according to these drawings, an ordinary skilled person in the art can obtain other drawings without paying any creative effort.

DESCRIPTION OF EMBODIMENTS

Figure 1:
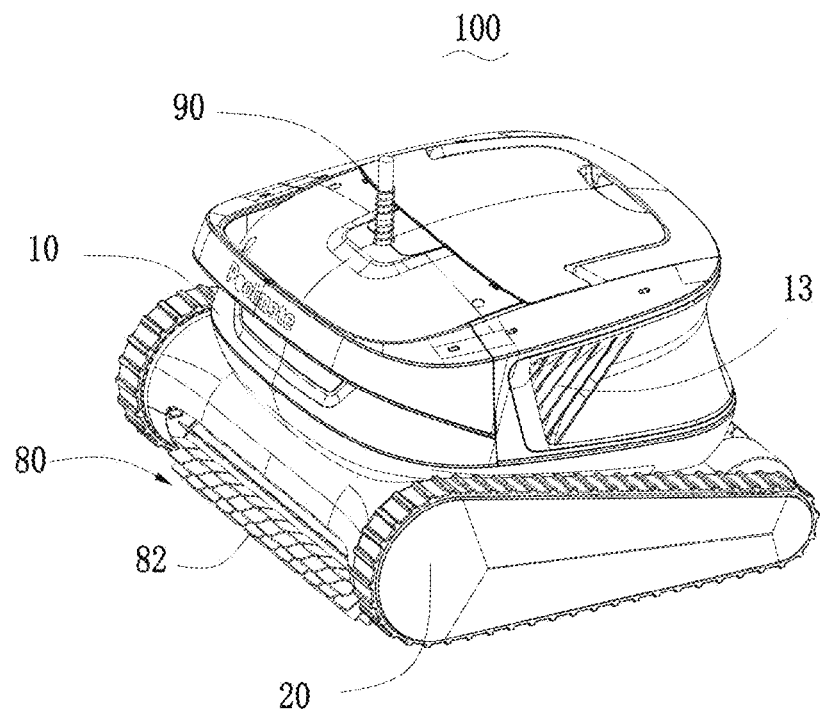
FIG. 1 is a perspective view of a pool-cleaning robot according to a first embodiment of the present disclosure.
Figure 2:
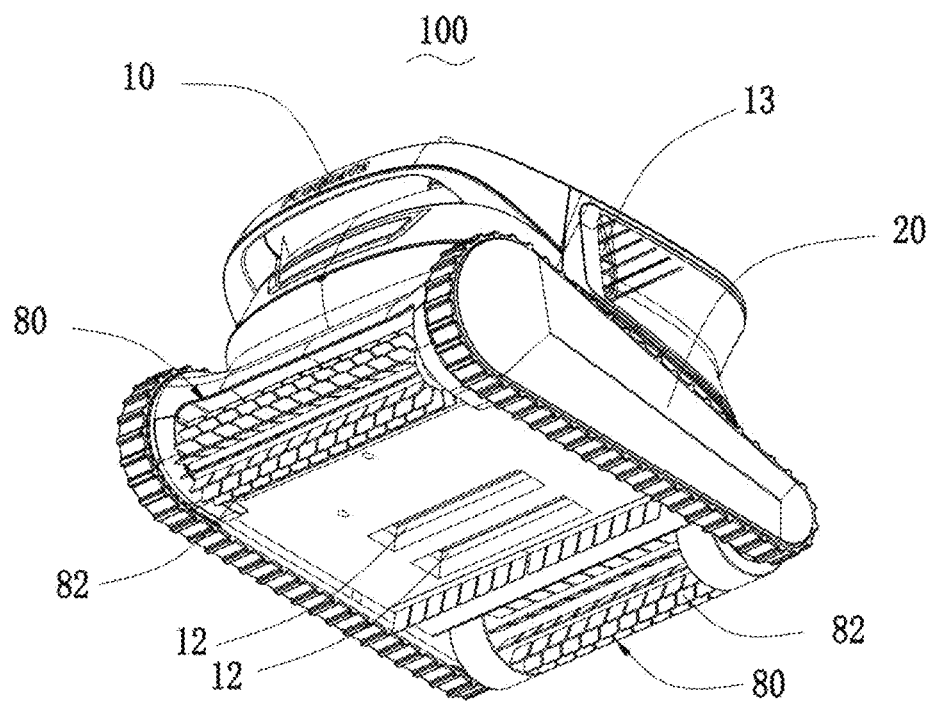
FIG. 2 is a perspective view of the pool-cleaning robot shown in FIG. 1 viewed from another angle.
Figure 3:
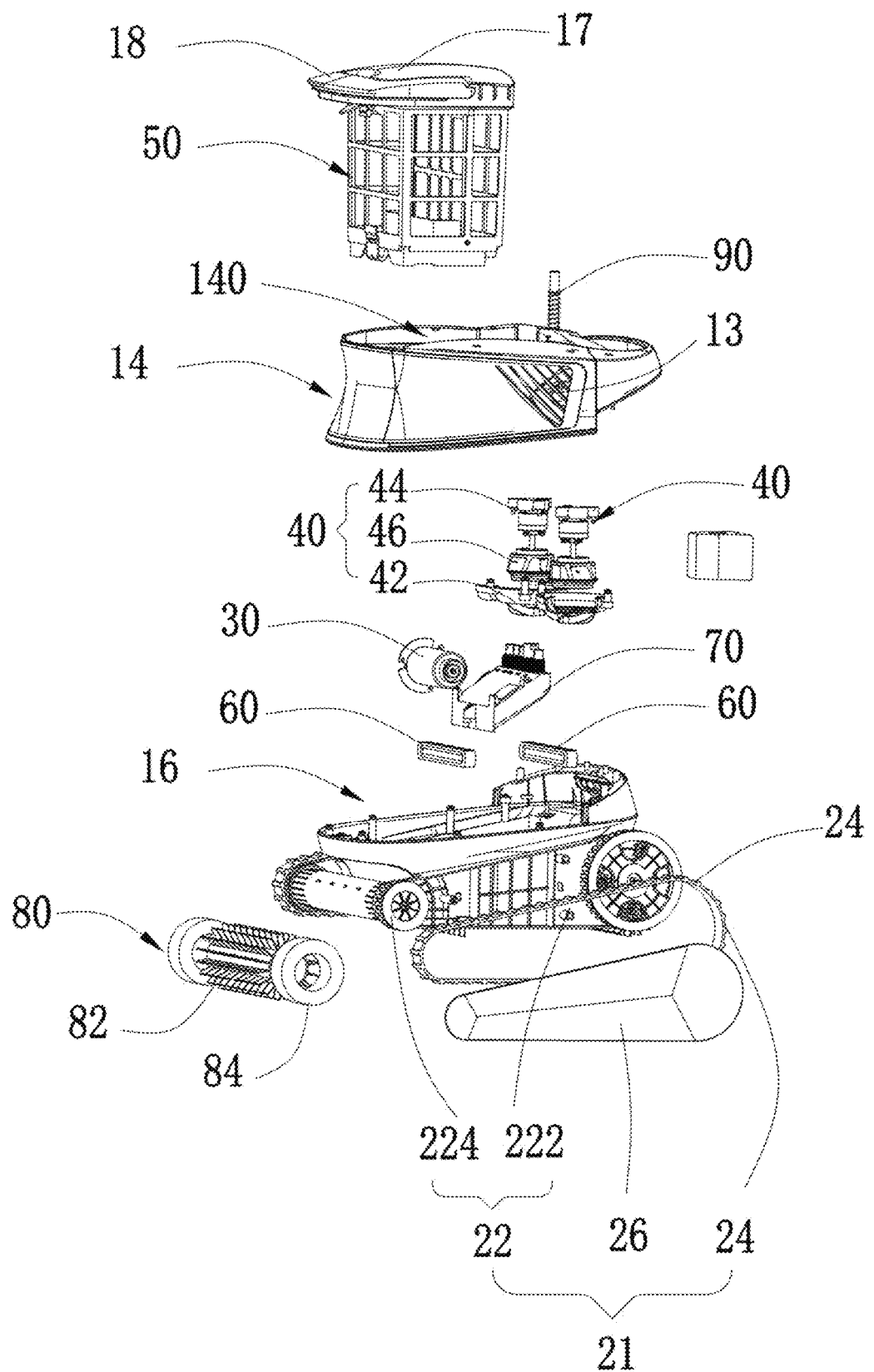
FIG. 3 is a three-dimensional exploded view of the pool-cleaning robot shown in FIG. 1.

In order to make the technical problems, solutions, and beneficial effects to be solved in the present application clearer, the following is a further detailed explanation of the present application in conjunction with the accompanying drawings and embodiments. It should be understood that the specific embodiments described here are only used to explain the present application and are not intended to limit it.

It should be noted that when a component is referred to as "fixed to" or "set to" other component, it can be directly or indirectly on the other component. When a component is referred to as "connected to" other component, it can be directly or indirectly connected to the other component.

It should be understood that the terms "length", "width", "up", "down", "front", "back", "left", "right", "vertical", "horizontal", "top", "bottom", "inside", "outside", and other indications of orientation or positional relationships are based on the orientation or positional relationships shown in the accompanying drawings, and are only for the convenience of describing the present application and simplifying the description, rather than indicating or implying that a device or component referred to must have a specific orientation, be constructed and operated in a specific orientation, it cannot be understood as a limitation of the present application.

Herein "inside" refers to the side closer to the center of the corresponding component or the center of the entire device, and "outside" refers to the side away from the center of the corresponding component or the center of the entire device.

In addition, the description of "first", "second" etc. in the present application is used for descriptive purpose only and is not to be understood as indicating or imply their relative importance or implicitly indicate the number of indicated technical features. Thus, features defined with "first", "second" may explicitly or implicitly include at least one such feature. In the description of the present application, "multiple" means two or more, unless otherwise specified.

FIGS. 1-9 show a pool-cleaning robot 100 according to a first embodiment of the present disclosure, which includes a housing 10 with a receiving chamber 11, a power assembly 20 connected to the housing 10, and a pump assembly 40, a filter assembly 50 and a germicidal lamp assembly 60 installed which are in the receiving chamber 11.

The power assembly 20 is configured to provide power to drive the pool-cleaning robot 100 to travel in the pool. In this embodiment, the power assembly 20 includes a walking assembly 21 and a driving assembly 30. The drive assembly 30 may include a drive motor and a reduction gearbox. The walking assembly 21 includes a wheelset 22, and the driving assembly 30 is in transmission connection with the wheelset 22 for driving the wheelset 22 to rotate, thereby driving the pool-cleaning robot 100 to move or turn in the pool.

The housing 10 defines a water inlet 12 and a water outlet 13. The germicidal lamp assembly 60 is arranged at the water inlet 12. The germicidal lamp assembly 60 includes a UV germicidal lamp, preferably a UV-C germicidal lamp, that is, the ultraviolet wavelength of the germicidal lamp is in a range of 200-280 nm, preferably 240-270 nm. Ultraviolet within this wavelength range has a powerful disinfection effect, and it can directly damage the DNA and RNA of cells and viruses, leading to their rapid death. Additionally, it effectively decomposes ozone in water. Of course, the germicidal lamp assembly 50 may also include other germicidal lamps suitable for underwater work.

Specifically, the germicidal lamp assembly 60 of this embodiment is disposed on an inner wall of one side of the water inlet 12 and extends along a length direction thereof. Preferably an entire flow channel of the water inlet 12 is located within an irradiation range of the germicidal lamp assembly 60. The germicidal lamp assembly 60 of this embodiment is arranged on a side wall of the flow channel of the water inlet 12 to directly sterilize the water entering the water inlet 12, effectively reducing the number of bacteria entering the filter assembly 50.

Preferably, the water inlet 12 is in a long strip shape, and the germicidal lamp assembly 60 is in a long strip shape, too. A length of the germicidal lamp assembly 60 is approximately equal to that of the water inlet 12, to fully increase the irradiation range of the water inlet 12 and improve the germicidal effect. It is understood that in other embodiments, the water inlet 12 may also be configured in other shapes, such as an arc or a circle. Correspondingly, the germicidal lamp assembly 60 is also preferably configured in an arc or annular shape matching the water inlet, so as to maximize the irradiation to the flow channel of the water inlet 12 and ensure the germicidal effect.

Figure 4:
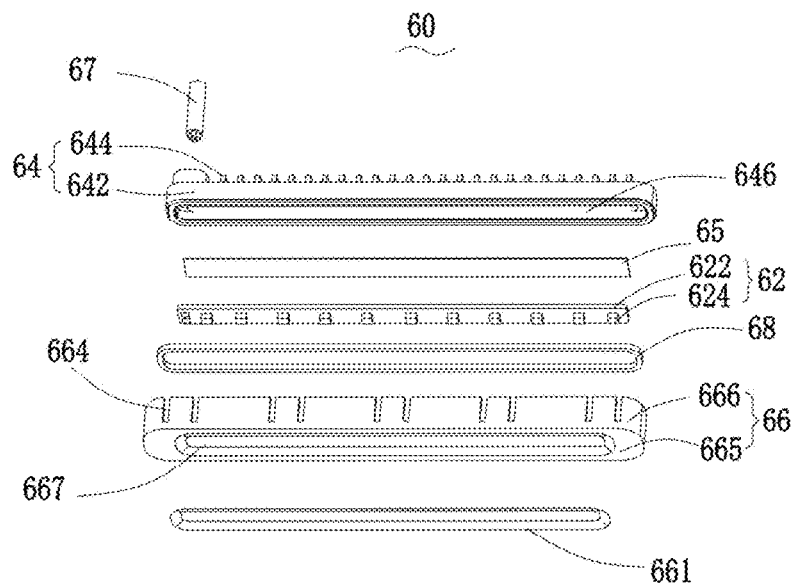
FIG. 4 is a three-dimensional exploded view of a germicidal lamp assembly of the pool-cleaning robot shown in FIG. 3.

As shown in FIG. 4, specifically, the germicidal lamp assembly 60 includes a light source module 62, a heat-dissipating seat 64 and a lamp cover 66. The heat-dissipating seat 64 includes a base 642 and a plurality of heat-dissipating fins 644 disposed on an upper side surface of the base 642. The light source module 62 is fixed on a lower side of the base 642 of the heat-dissipating seat 64.

The light source module 62 includes a substrate 622 and a plurality of lamp beads 624 disposed on the substrate 622. In this embodiment, the lamp balls 624 are arranged in a straight line along the substrate 622. It is understood that the arrangement of the lamp beads 624 is not limited to this. The substrate 622 is attached to a lower surface of the base 642. The lamp beads 624 are disposed on a side of the substrate 622 facing away from the base 642. Connecting surfaces between the substrate 622 and the base 642 are preferably coated with thermal conductive paste 65, which is beneficial for quickly conducting the heat from the substrate 622 to the base 642 of the heat-dissipating seat 64, and then dissipating the heat through the heat-dissipating fins 644. The heat-dissipating seat 64 is preferably made of a metal material with good thermal conductivity, such as aluminum or copper, etc.

The lamp cover 66 is connected to the base 642 of the heat-dissipating seat 64 for covering the light source module 62 inside to protect a circuit of the light source module 62. Preferably, a sealing ring 68 is provided between the lamp cover 66 and the lower surface of the base 642 to seal the light source module 62 and prevent water seepage from damaging the circuit of the light source module 62 during underwater operation.

Preferably, a bottom surface of the base 642 is recessed inwardly to form an accommodation cavity 646, and the light source module 62 is received in the accommodation cavity 646. The lamp cover 66 is connected to the base 642 in a sealed manner, thereby enclosing the accommodating cavity 646 of the base 642, as well as sealing the accommodating chamber 646 by means of the sealing ring 68.

In this embodiment, the lamp cover 66 is snapped on a periphery of the base 624 of the heat-dissipating seat 64, and is preferably tightly fitted. Specifically, the lamp cover 66 includes an end wall 665 and a side wall 666 extending from a periphery of the end wall 665. To facilitate assembly, a plurality of slits 664 are defined on a perimeter of the lamp cover 66. The configuration of the slits 664 facilitates the deformation of the perimeter of the lamp cover 66 to expand slightly outwardly during assembly so that it is easily sleeved onto the periphery of the base 624. Preferably, an area of the lamp cover 66 corresponding to the lamp bead 624 of the light source module 62 is a light-transmitting area 667, and the material of the light-transmitting area 667 is transparent. The transparent material may be quartz, glass, or plastic. In this embodiment, the light-transmitting area 667 is located at a central portion of the end wall 665. The light-transmitting area 667 is concave relative to an outer surface of the end wall 665.

Preferably, a light-emitting surface of the light-transmitting 667 of the lamp cover 66 is provided with a protective film 661, and the protective film 661 covers the transparent material of the lamp cover. As a surface of the lamp cover 66 of the UV lamp assembly 60 often undergoes curing reactions in the pool, the surface of the lamp cover 66 will harden and attract a layer of impurities over a long period, thereby reducing the transmittance of ultraviolet light and affecting the germicidal efficiency. The configuration of the protective film 661 is conducive to isolating impurities. During use, the protective film 661 can be replaced regularly for easy maintenance.

Figure 8:
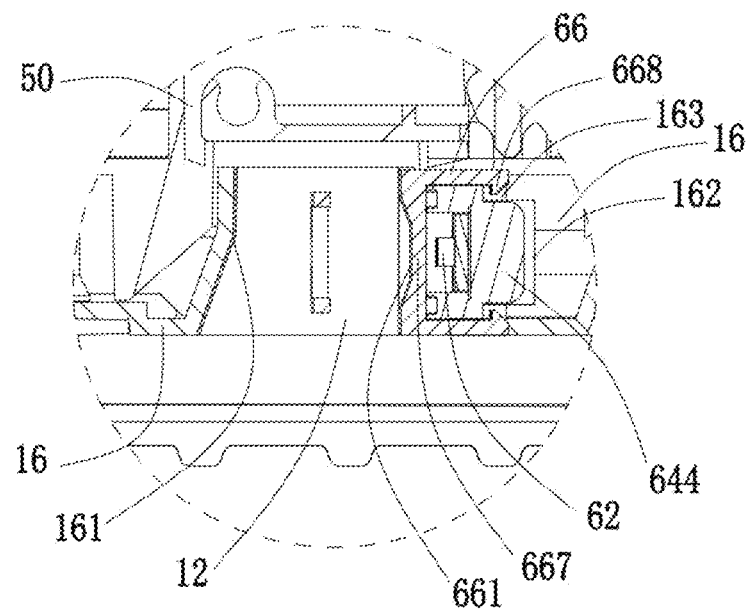
FIG. 8 is an enlarged view of a circled portion in FIG. 7.
Figure 9:
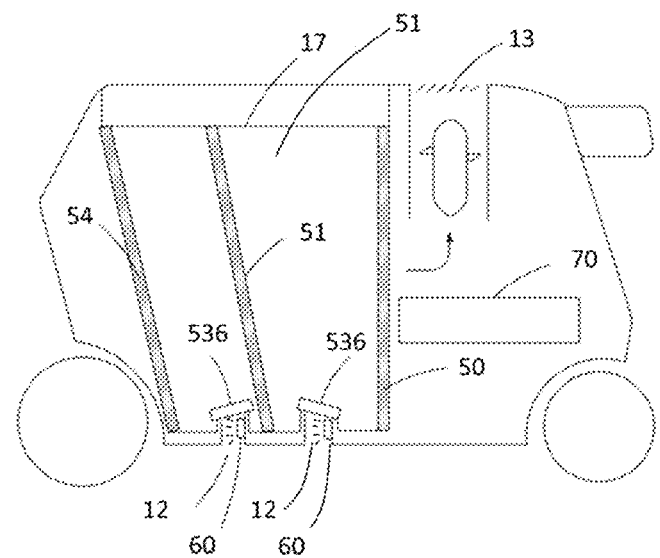
FIG. 9 is a simplified module diagram of the pool robot shown in FIG. 1.

In this embodiment, referring to FIG. 8, the germicidal lamp assembly 60 is installed on the housing 10 through a snap connection. The inner wall of the water inlet 12 of the housing 10 defines a slot 163, and an end of the side wall 666 of the lamp cover 66 of the germicidal lamp assembly 60 is provided with a hook 668, which protrudes from the heat-dissipating seat 64. The hook 668 is engaged in the slot of the housing 10, thereby allowing the germicidal lamp assembly 60 to be securely mounted within the flow channel of the water inlet 12. Preferably, the inner wall of the housing 10 further defines a groove 162. When the germicidal lamp assembly 60 is snapped onto the housing 10, the heat-dissipating fins 644 protruding from the germicidal lamp assembly 60 are received in the groove 162 of the housing 10.

Preferably, a reflective material 161 is provided on the other side wall of the water inlet 12 opposite to the germicidal lamp assembly 60. On the one hand, the germicidal effect can be enhanced, and on the other hand, in the case where the housing is made of plastic, the housing 10 can be safeguarded from aging by the long-term irradiation of the germicidal lamp assembly 60. The reflective material 161 may be a reflective layer directly coated on a bottom wall, or may be a reflective film, reflective paper or reflective sheet additionally arranged on the side wall, e.g., tin foil.

Continuing to refer to FIGS. 1 to 8, in this embodiment, the housing 10 is composed of an upper housing 14 and a lower housing 16 connected one another, with the receiving chamber 11 defined between the upper housing 14 and the lower housing 16. The water inlet 12 is defined at a bottom of the lower housing 16, and the water outlet 13 is defined on the upper housing 14. The water inlets 12 and two water outlets 13 are each furnished with two. In this embodiment, a number of water inlets 12 is two, and correspondingly, a number of germicidal lamp assemblies 60 is also two. The two germicidal lamp assemblies 60 are respectively disposed at the two water inlets 12. Specifically, in this embodiment, the two germicidal lamp assemblies 60 are installed on side walls of the same side of the two water inlets 12, that is, the two germicidal lamp assemblies 60 are disposed in parallel, and irradiation directions of the two germicidal lamp assemblies 60 are identical in this embodiment. The pump assembly 40 is arranged in a flow channel of the receiving chamber 11. The pump assembly 40 includes a pump casing 42, a pump motor 44 and an impeller 46. Driven by the pump motor 44, the impeller 46 drives the water flowing in from the water inlet 12, and then out from the water outlet 13 after passing through the flow channel. The filter assembly 50 is arranged in the flow channel between the water inlet 12 and the water outlet 13. The filter assembly 50 may include a filter paper, a gauze, a filter screen or other filter components, to filter the water entering from the water inlet 12 and then discharge it to the outlet 13, thereby discharging the filtered water from the water outlet 13.

In some embodiments, the motor of the driving assembly 30 may be integrated with the pump motor 44, or the driving assembly 30 may be simultaneously used to drive the pump, that is, the driving assembly 30 has a plurality of output shafts for respectively connecting and driving the wheelset and the impeller of the pump assembly.

The receiving chamber 11 of the housing 10 is further provided with a control device 70. The control device 70 includes a sealed control box, as well as a power module and a control module which are arranged within the control box. In this embodiment, the pool-cleaning robot 100, which is cable-powered, includes a power supply connection cable 90. The power supply connection cable 90 connects the onshore power supply with the power module of the control device 70. In other embodiments, the pool-cleaning robot 100 may also employ a wireless power supply. In the wireless power supply embodiment, the power module includes a rechargeable battery.

The control device 70 is electrically connected to the pump assembly 40 and the power assembly 20 for supplying power to the pump assembly 40 and the power assembly 20. In this embodiment, the control device 70 is electrically connected to the drive assembly 30 to supply power thereto, and controls the movement of the walking assembly 21 through the drive assembly 30, thereby controlling the direction of movement, speed, and the like of the pool-cleaning robot 100. In some embodiments, it is also possible to assist the movement or steering of the body by means of the flow ejection caused by the flow guiding of the pump assembly 40. The control device 70 is also electrically connected to the germicidal lamp assembly 60 to power or control it.

Specifically, in this embodiment, the wheelset 22 of the traveling assembly 21 includes a pair of driving wheels 222 and a pair of driven wheels 224. The traveling assembly 21 further includes two crawler tracks 24 connecting the driving wheel 222 and the driven wheel 224. Each crawler track 24 is connected to a driving wheel 222 and a corresponding driven wheel 224. The driving wheels 222 are driven to rotate by the driving assembly 30, and the driven wheels 224 are driven to rotate synchronously through the crawler tracks 24, thereby achieving the movement of the pool-cleaning robot 100. Preferably, in this embodiment, there is also a side plate 26 configured to cover the walking assembly 21.

Preferably, in this embodiment, at least one roller brush 80 is further provided, which is substantially cylindrical, with a plurality of brush blades 82 disposed on its periphery. The roller brush 80 may be mounted around a wheel axle between the two driving wheels 222 and/or between the two driven wheels 224. In this way, when the pool-cleaning robot 100 moves, the roller brush 80 is driven to rotate, and the trash debris at the bottom of the pool is cleaned synchronously by the brush blades 82.

Preferably, the roller brush 80 further includes sleeves 84 located at both axial ends thereof. The sleeves 84 are preferably made of an anti-slip material (e.g. a sponge) to increase the friction and adhesion between the roller brush 80 and the pool wall and improve the rotation stability of the roller brush 80.

Figure 10:
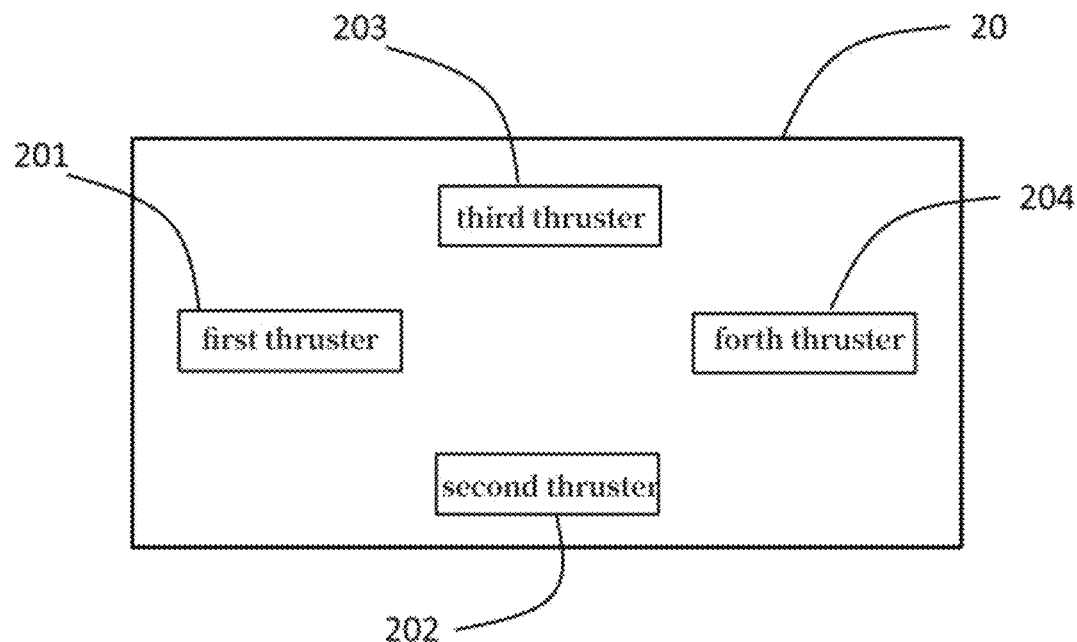
FIG. 10 is a schematic module diagram of another embodiment of a power assembly of the pool-cleaning robot shown in FIG. 1.
Figure 11:
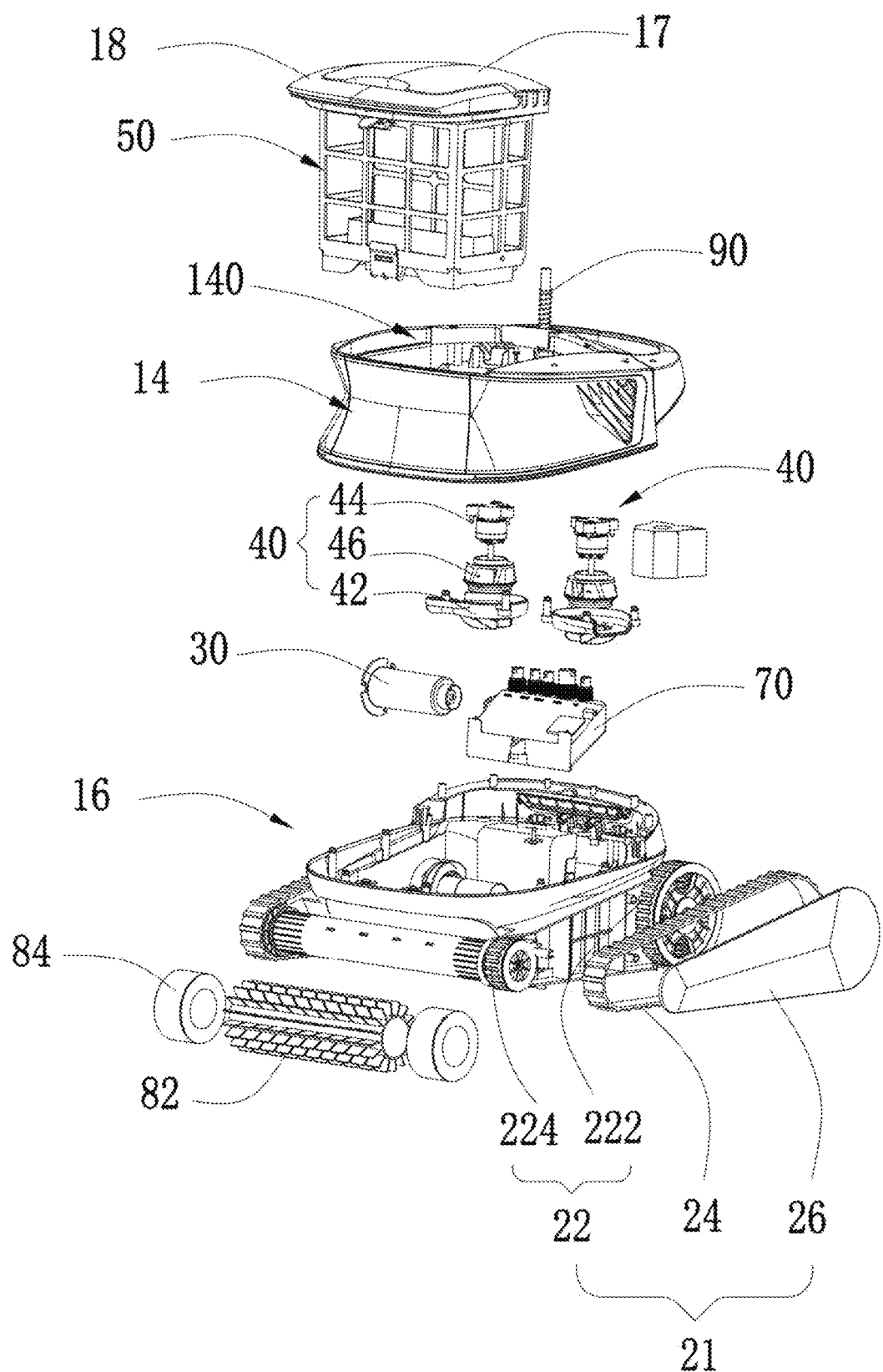
FIG. 11 is an exploded perspective view of a pool-cleaning robot according to a second embodiment of the present disclosure.
Figure 12:
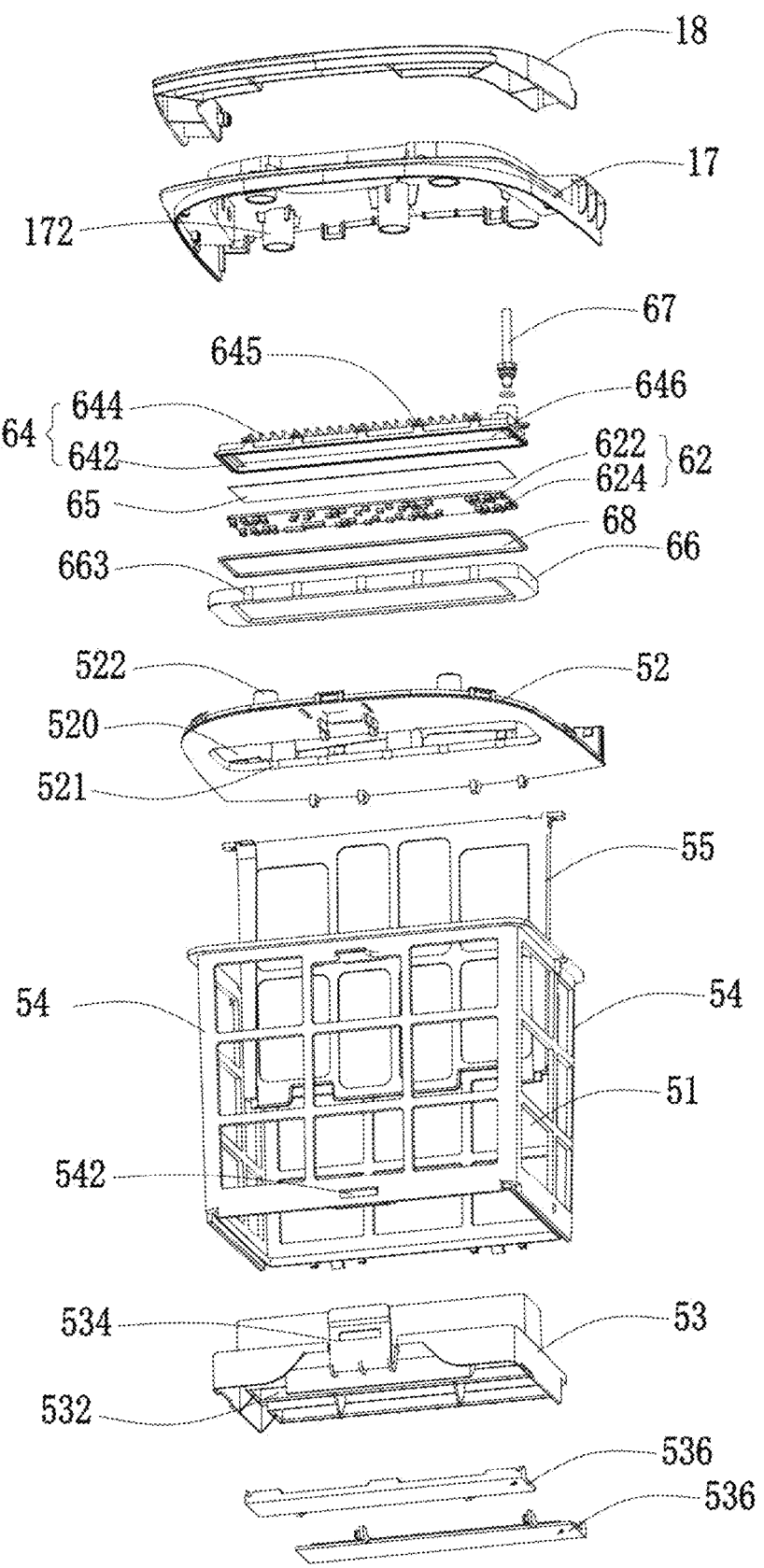
FIG. 12 is a three-dimensional exploded view of a filter assembly and a germicidal lamp assembly of the pool-cleaning robot shown in FIG. 11.
Figure 13:
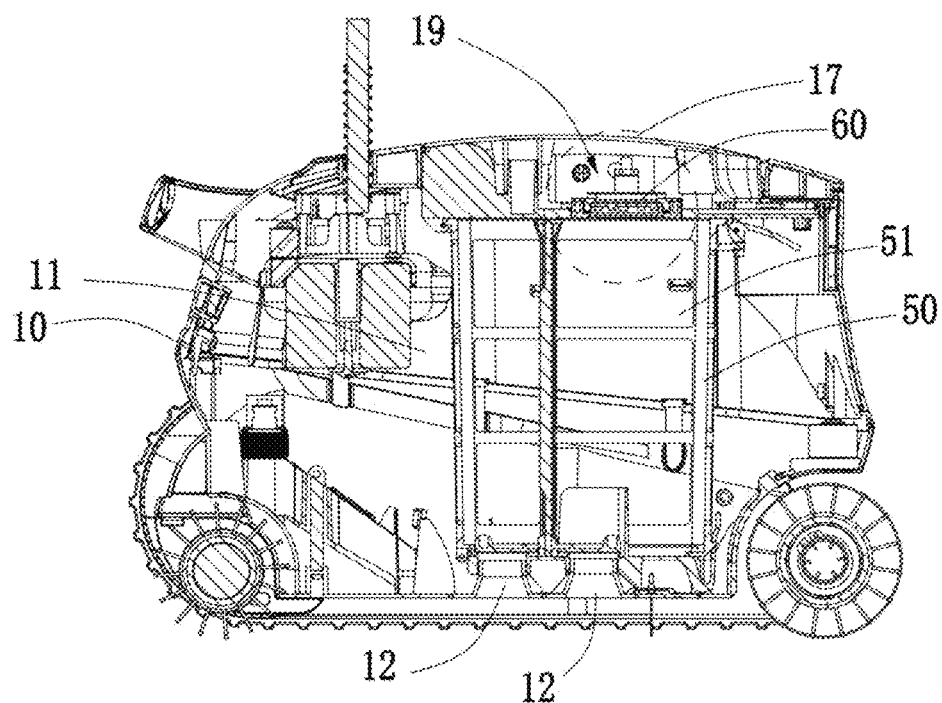
FIG. 13 is a cross-sectional view of the pool-cleaning robot shown in FIG. 11 being in an assembled state.
Figure 14:
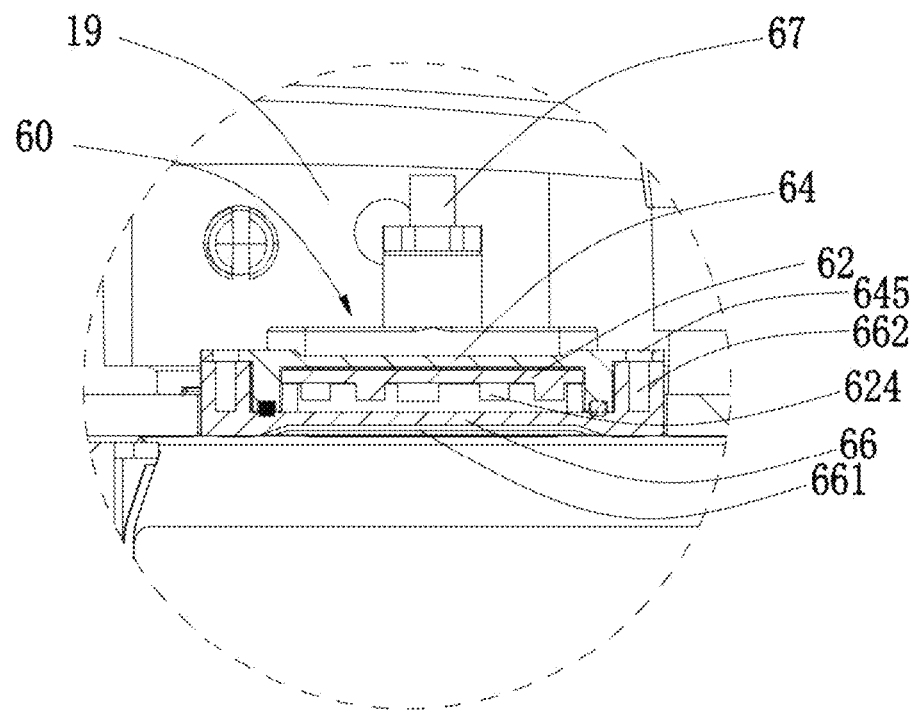
FIG. 14 is an enlarged view of a circled portion in FIG. 13.
Figure 15:
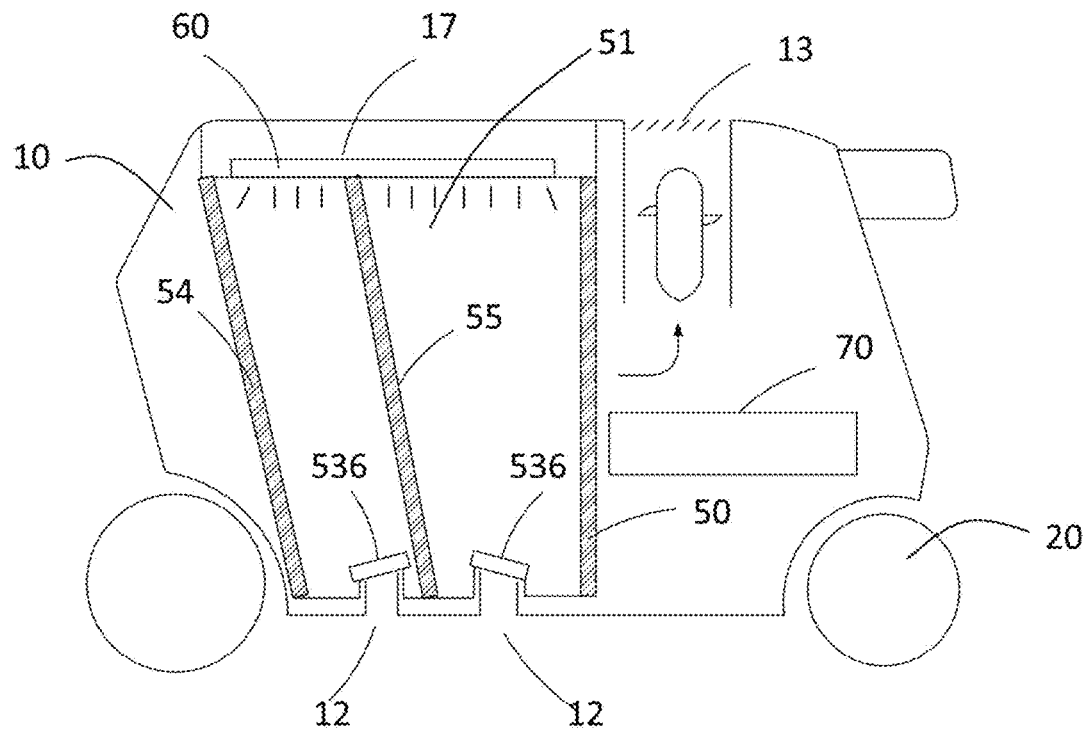
FIG. 15 is a simplified module schematic diagram of the pool-cleaning robot shown in FIG. 11.

As an alternative embodiment, as shown in FIG. 10, the power assembly 20 may also include a plurality of thrusters 201-204. The plurality of thrusters may include at least one first thruster 201 for driving the pool-cleaning machine 100 to move forwardly, at least one second thruster 202 for driving the pool-cleaning robot 100 to turn left, and at least one third thruster 203 for driving the pool-cleaning robot 100 to turn right. Movements and steerings of the pool-cleaning robot 100 within the pool may likewise be achieved by employing the plurality of thrusters 201-204. Preferably, the power assembly 20 may also include at least one fourth thruster 204 for driving the pool-cleaning robot 100 to move backwardly.

Preferably, a top of the upper housing 14 has an opening 140. A top cover 17 covers the opening 140 and is openable to expose the opening 140. The filter assembly 50 is detachably installed in the receiving chamber 11. During installation or maintenance, the filter assembly 50 can be put in or taken out through the opening 140. The configuration of the opening 140 makes it convenient to disassemble and clean the filter assembly 50, or to replace the filter screen.

Figure 5:
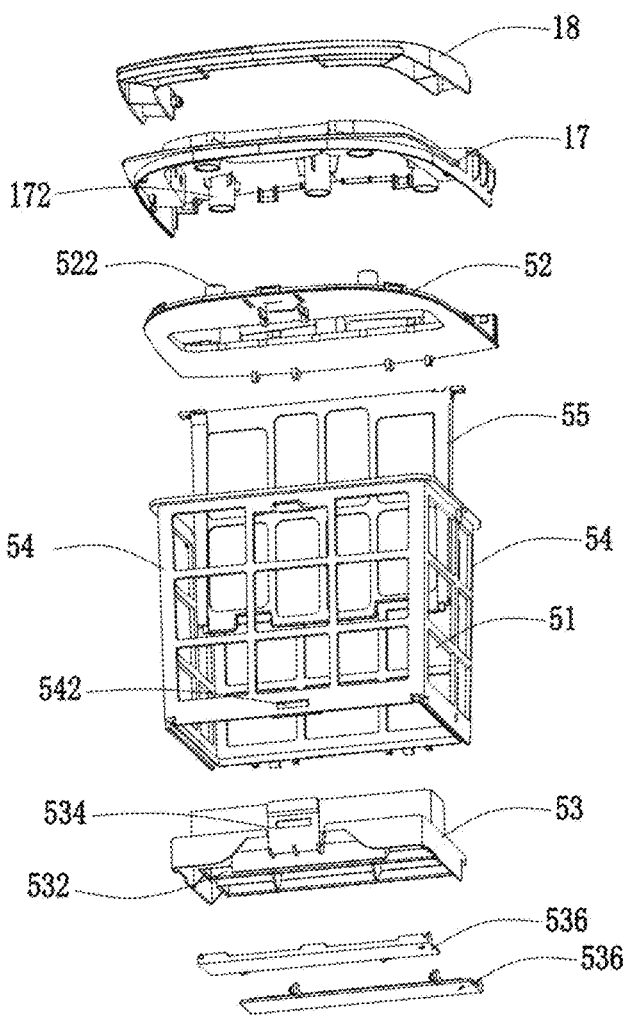
FIG. 5 is an exploded perspective view of a filter assembly of the pool-cleaning robot shown in FIG. 3.
Figure 6:
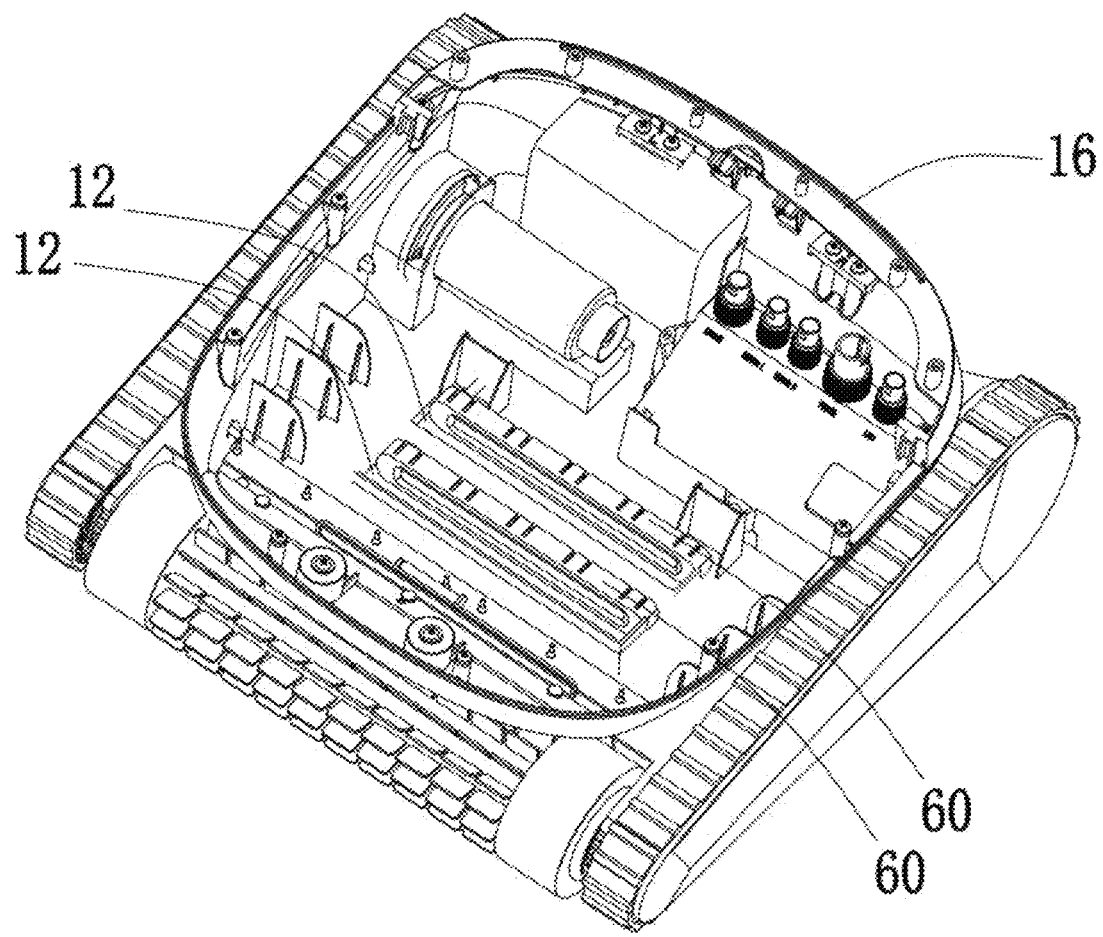
FIG. 6 is a perspective view of a lower housing of the pool-cleaning robot shown in FIG. 1.
Figure 7:
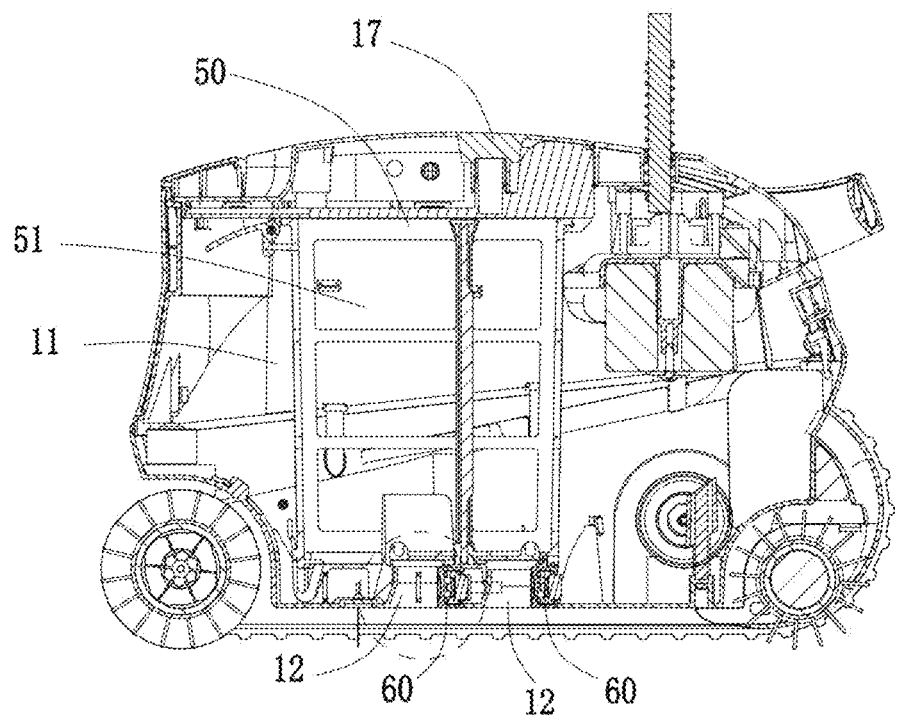
FIG. 7 is a cross-sectional view of the pool-cleaning robot shown in FIG. 1.

Specifically referring to FIG. 5, in this embodiment, the filter assembly 50 is a basket filter device, which has a top plate 52, a bottom plate 53 and a side wall 54 connecting the top plate 52 and the bottom plate 53. The top plate 52, the bottom plate 53 and the side walls 54 together define the filter chamber 51. The side wall 54 is made as a perimeter-enclosed filter screen. The side wall 54 is substantially enclosed in a rectangular shape with openings at upper and lower ends. The top plate 52 is connected to the upper end of the side wall 54 and covers the upper opening. The bottom plate 53 is connected to the lower end of the side wall 54 and covers the lower opening. The top plate 52 and the bottom plate 53 are detachably connected to the side wall 54, for example, by a snap connection, or by a screw connection. Specifically, in this embodiment, a block or hook 542 is provided at a periphery of a bottom of the side wall 54, and a periphery of the bottom plate 53 extends towards the side wall 54 to form a connecting portion 534, which defines a snapping hole corresponding to the block or hook 542. The snapping hole matches with the block or hook 542 to achieve the snap connection between the side wall 54 and the bottom plate 53. The top plate 52 and the side wall 54 may also connected through the same or similar snap connection, which will not be further described here.

In this embodiment, the top plate 52 of the filter assembly 50 is fixedly connected to the top cover 17 of the housing 10.

Preferably, the top cover 17 is also connected with a handle 18. In other embodiments, the top cover 17 is rotatably connected to the upper housing 14 and is reversible relative to the upper housing 14 to open or cover the opening 140. In this case, the filter assembly 50 is either removably connected or not fixedly connected to the top cover 17, allowing the filtration assembly 50 to be easily accessed by opening the top cover 17. In some embodiments, opposing surfaces of the top plate 52 of the filter assembly 50 and the top cover 17 are provided with positioning structures cooperating with each other. Specifically, a first positioning portion 522 is provided on a surface (i.e. an upper surface) of the top plate 52 facing the top cover 17, and a second positioning portion 172 is provided on a surface (i.e. a lower surface) of the top cover 17 facing the top plate 52. The first positioning portion 522 and the second positioning portion 172 cooperate with each other to allow for positional alignment of the top plate 52 and the top cover 17 before installation. Preferably, the first positioning portion 522 of the top plate 52 is a first protruding post, and the second positioning portion 172 of the top cover is a second protruding post with a positioning hole. When the top plate 52 is positionally aligned with the top cover 17, a tip of the first protruding post is engaged in the positioning hole of the second protruding post.

A bottom end of the filter assembly 50 detachably abuts against an inner wall of the lower housing 16. The bottom plate 53 of the filter assembly 50 defines an inlet 532 at a position corresponding to the water inlet 12 of the housing 10. Preferably, a shape and size of the inlet 532 match those of the water inlet 12. The bottom plate 53 further includes a bottom cover 536 pivotally openable to cover the inlet 532. In this embodiment, the two water inlets 12 of the housing 10 include a main water inlet 12 and an auxiliary water inlet 12. The main water inlet 12 is open when working, while the auxiliary water inlet 12 is closed. The bottom cover 536 corresponding to the auxiliary water inlet 12 is provided with a counterweight. When the pool-cleaning robot 100 climbs the wall, the bottom cover 536 at the auxiliary water inlet 12 opens under the action of gravity, thereby opening the auxiliary water inlet 12. That is, when the pool-cleaning robot 100 climbs the wall, the two water inlets 12 are both open. This increases the water flowing into the flow channel, which in turn increases the water flowing out of the water outlet 13 as well as increasing the counterthrust force, allowing the pool-cleaning robot 100 to securely adhere to the wall of the pool for cleaning under the counterthrust force.

Preferably, the filter assembly 50 further includes a middle partition 55 located in the filter chamber 51. The middle partition 55 is located at a central portion of the filter chamber 51, dividing the filter chamber 51 in half. A top end of the middle partition 55 abuts against the top plate 52, and a bottom end of the middle partition 55 abuts against the bottom plate 53. The configuration of the middle partition 55 is conducive to enhancing the filtering effect.

The germicidal lamp assembly 60 is electrically connected to the control device 70 so as to be powered and controlled by the control device 70. The germicidal lamp assembly 60 is therefore preferably fixedly mounted in the housing 10. The germicidal lamp assembly 60 further includes a power supply cable 67 electrically connected to the light source module 62. The power supply cable 67 may be arranged along the inner wall of the housing 10 and signal connected to the control mainboard within the control device 70 for power supply and control.

When the above pool-cleaning robot 100 is in use, the housing 10 walks in the pool through the walking assembly 21 and its internal driving assembly 30. Under the action of the pump assembly 40, the pool water enters the filter assembly 50 from the water inlet 12, and is discharged from the water outlet 13 after being filtered through the filter screen, achieving the objective of cleaning the pool water. In this process, the germicidal lamp assembly 60 irradiates the water in the flow channel of the water inlet 12 throughout, to sterilize and disinfect the water after entering the housing 10 but before filtration, which prevents bacterial contaminants carried in the water from accumulating on the filter assembly 50 and causing secondary pollution to the water. Additionally, it also prevents the generation of odor due to excessive bacteria inside the filter assembly 50, decreasing the frequency of cleaning and replacing the filter assembly 50, and greatly improving the customer experience.

In this embodiment, the pool-cleaning robot 100 is cable-powered, which allows the use of high-power germicidal lamps for long-term operation. This ensures that when the high-speed flowing water is sterilized during operation, bacteria in the water can be effectively eliminated, ensuring the germicidal effect.

On the other hand, a pool-cleaning robot generally follows an electronic control box for power supply or a buoy for enhanced communication. The buoy floats on the water, and a germicidal lamp assembly 60 may be provided at a bottom of the buoy to sterilize and disinfect a portion of the water.

FIGS. 11-15 illustrate a pool-cleaning robot according to a second embodiment of the present disclosure. This embodiment is similar to the first embodiment, except for the position of the germicidal lamp assembly 60. In this embodiment, there is only one germicidal lamp assembly 60 provided, and the germicidal lamp assembly 60 is disposed on an inner wall of a top cover 17 of a housing 10. In addition, the structure of the germicidal lamp assembly 60 of this embodiment is also slightly altered.

Similar to the above embodiment, the germicidal lamp assembly 60 of this embodiment also includes a light source module 62, a heat-dissipating seat 64 and a lamp cover 66. The heat-dissipating seat 64 includes a base 642 and a plurality of heat-dissipating fins 644 provided on an upper side surface of the base 642. The light source module 62 is fixed on an underside of the base 642 of the heat-dissipating seat 64. The light source module 62 includes a substrate 622 and a plurality of lamp beads 624 disposed on the substrate 622. The substrate 622 is attached to a lower surface of the base 642. The lamp beads 624 are disposed on a side of the substrate 622 facing away from the base 642. Connecting surfaces between the substrate 622 and the base 642 are coated with thermal conductive paste 65, which is beneficial for quickly conducting the heat from the substrate 622 to the base 642 of the heat-dissipating seat 64, and then dissipating the heat through the heat-dissipating fins 644. The lamp cover 66 is connected to the base 642 of the heat-dissipating seat 64 for enclosing the light source module 62 inside, to protect a circuit of the light source module 62. Preferably, a sealing ring 68 is provided between the lamp cover 66 and the lower surface of the base 642 to seal the light source module 62 and prevent water seepage from damaging the circuit of the light source module 62 during underwater operation.

Preferably, a bottom surface of the base 642 is recessed inwardly to form an accommodation cavity 646, and the light source module 62 is received in the accommodation cavity 646. A perimeter of the lamp cover 66 is connected to a bottom perimeter of the base 642, thereby enclosing the accommodation cavity 646 of the base 642, as well as sealing the accommodation cavity 646 through the sealing ring 68.

Similar to the above embodiment, an area of the lamp cover 66 corresponding to the lamp bead 624 of the light source module 62 in this embodiment is a light-transmitting area 667. A material of the light-transmitting area 667 is transparent. The transparent material may be quartz, glass, or plastic. Preferably, a light-emitting surface of the light-transmitting area 667 of the lamp cover 66 is provided with a protective film 661, which covers the transparent material of the lamp cover. As the surface of the lamp cover 66 of the UV lamp assembly 60 often undergoes curing reactions in the pool, the surface of the lamp cover 66 will harden and attract a layer of impurities over a long period, thereby reducing the transmittance of ultraviolet light and affecting the germicidal efficiency. The configuration of the protective film 661 is conducive to isolating impurities. During use, the protective film 661 can be replaced regularly for easy maintenance.

It is also preferred that a reflective material may be provided on a bottom wall of the housing 10. On the one hand, the germicidal effect can be improved, and on the other hand, in the case where the housing is made of plastic, it can be safeguarded from aging by the long-term irradiation of the germicidal lamp assembly 60. The reflective material 161 may be a reflective layer directly coated on a bottom wall, or may be a reflective film, reflective paper or reflective sheet, additionally provided on the side wall, e.g., tin foil.

The difference between the germicidal lamp assembly 60 of this embodiment and the germicidal lamp assembly 60 of the first embodiment is that in this embodiment, the germicidal lamp assembly 60 is installed in an installation space 19 between the top plate 52 and the top cover 17.

Preferably, a sealing ring may be provided around a perimeter of the top plate 52 of the filter assembly 50 contacting the top cover 17 to form a sealed connection, thereby sealing the installation space 19.

In some embodiments, the germicidal lamp assembly 60 is embedded in the top plate 52 of the filter assembly 50. Specifically, a perforation 520 is defined at a central portion of the top plate 52 corresponding to the lamp cover 66 of the germicidal lamp assembly 60, in which the lamp cover 66 of the germicidal lamp assembly 60 is engaged. Light from the light source module 62 passes through the lamp cover 66 and then directly irradiates the filter chamber 51 and the filter screen around it after passing through the perforation 520. Preferably, limiting structures are provided between the periphery of the lamp cover 66 and a wall portion of the top plate 52 defining the through hole 520. Specifically, the limiting structures include a limiting protrusion 663 arranged on the periphery of the lamp cover 66 and a limiting groove 521 formed on the wall of the top plate 52, thus, the precise positioning of the lamp cover 66 with the top plate 52 is achieved through the cooperation of the limiting projection 663 and the limiting recess 521.

As an example, the base 642 is connected to the lamp cover 66 through fasteners. Specifically, a peripheral edge of the base 642 defines a plurality of fixing holes 645, and a perimeter of the lamp cover 66 correspondingly defines a plurality of connecting holes 662, which are threaded holes. During installation, the fixing holes 645 of the base 642 are aligned with the connecting holes 662 of the lamp cover 66, and the fasteners (such as bolts and screws) may be passed through the fixing holes 645 and threadedly connected to the connecting holes 662 to achieve the assembly of the germicidal lamp assembly 60.

In this embodiment, the top cover 17 is relatively fixedly connected to the top plate 52 of the filter assembly 50. In other embodiments, instead of being connected with the top plate 52 of the filter assembly 50, the top cover 17 may be rotatably connected to the upper housing 14 on one side so that it is reversible to open or close the opening. In this case, the germicidal lamp assembly 60 is preferably fixed relative to the top cover 17, that is, the germicidal lamp assembly 60 is fixedly connected to the inner side of the top cover 17 for easy wiring.

In the pool-cleaning robot of the embodiment of the present disclosure, since the filter screen is usually not completely vertical, and on the other hand, dirt is also accumulated at a bottom of the filter assembly 50, the light source module 62 can directly irradiate the filter screen and surface of the dirt. The objective of germicidal and disinfection can be fully achieved.

When the above pool-cleaning robot 100 is in use, the housing 10 walks in the pool through the walking assembly 21 and its internal driving assembly 30. Under the action of the pump assembly 40, the water in the pool enters the filter assembly 50 from the water inlet 12, and is discharged from the water outlet 13 after being filtered through the filter screen, to achieve the objective of cleaning the pool water. In this process, the germicidal lamp assembly 60 irradiates the filter screen and the surface of the dirt throughout, to sterilize and disinfect the filter assembly and the water being filtered by the filter assembly, which prevents secondary pollution to the water. At the same time, it also prevents the generation of odor due to excessive bacteria inside the filter assembly 50, reducing the frequency of cleaning and replacing the filter assembly 50, and greatly improving the customer experience.

Other components of this embodiment are the same as those of the first embodiment. For details, please refer to the above-detailed description of the first embodiment, which will not be described again here.

Figure 16:
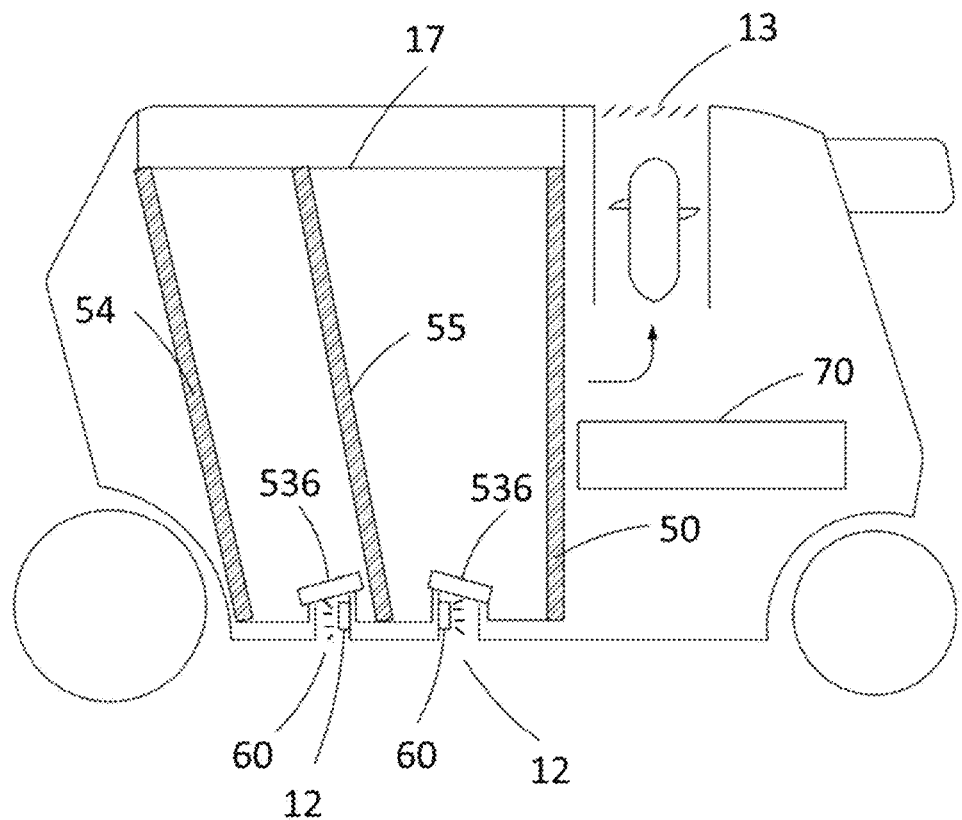
FIG. 16 is a simplified module schematic diagram of a pool-cleaning robot according to a third embodiment of the present disclosure.
Figure 17:
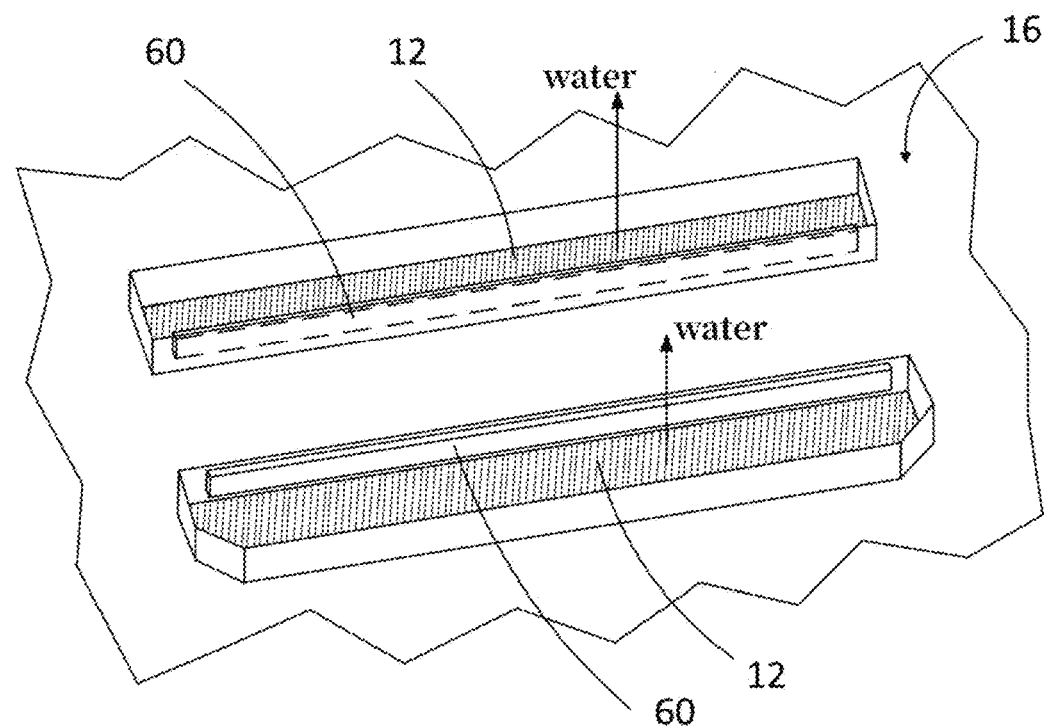
FIG. 17 is a perspective view of a lower housing of the pool-cleaning robot shown in FIG. 14.

FIGS. 16-17 illustrate a pool-cleaning robot according to a third embodiment of the present disclosure. This embodiment is similar to the above first embodiment, differing only in the location of the germicidal lamp assembly 60.

In this embodiment, two germicidal lamp assemblies 60 are also respectively installed on the side walls of the flow channels of the two water inlets 12 and extend along the length direction of the water inlets 12. The water entering the water inlet 12 undergoes direct germicidal operation, which effectively reduces the number of bacteria entering the filter assembly. It will be appreciated that the shape and size of the two germicidal lamp assemblies 60 are adapted to those of the water inlets 12. For example, when the water inlets 12 are arc-shaped, the germicidal lamp assemblies 60 are preferably also arc-shaped. When the water inlets are circular, the germicidal lamp assembly 60 is annular.

Different from the first embodiment, in this embodiment, two germicidal lamp assemblies 60 are disposed on the side walls of the adjacent sides of the two water inlets 12, and the irradiation directions of the two germicidal lamp assemblies 60 are opposite to each other.

The specific structures of the housing, filter assembly, germicidal lamp assembly, etc. of this embodiment are the same as those of the above embodiment. For details, please refer to the above-detailed description of the first embodiment, which will not be described again here.

Figure 18:
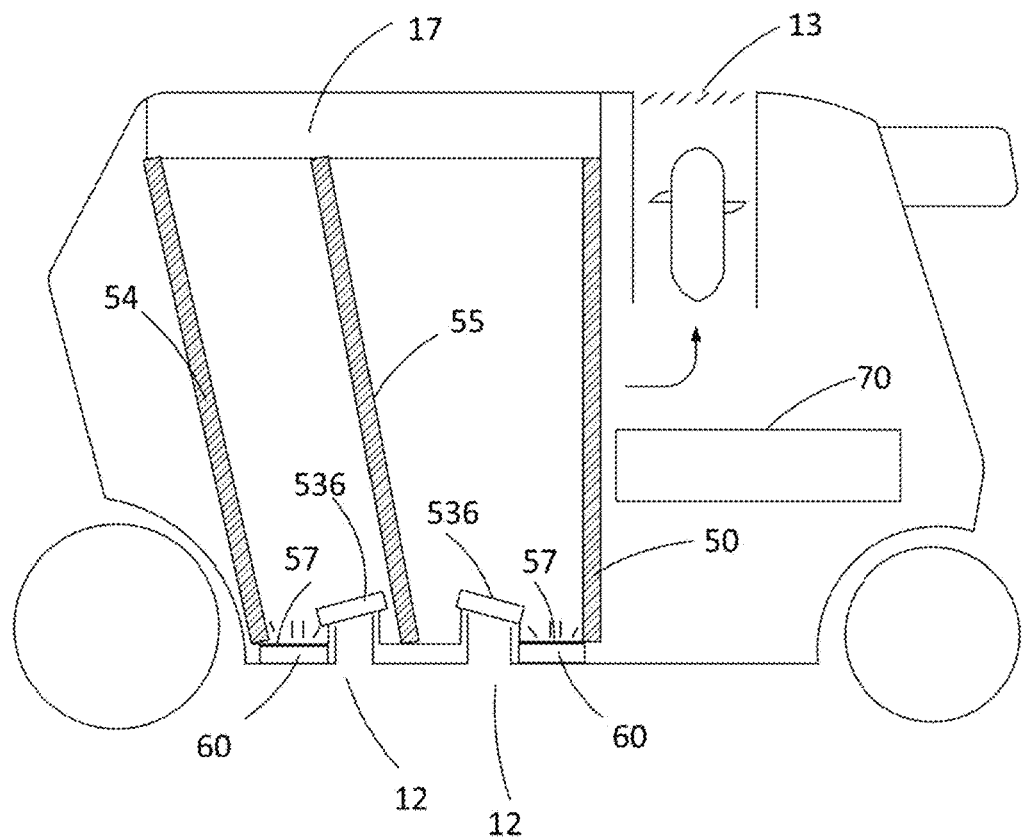
FIG. 18 is a simplified module schematic diagram of a pool-cleaning robot according to a fourth embodiment of the present disclosure.

FIG. 18 shows a pool-cleaning robot according to a fourth embodiment of the present disclosure. This embodiment is similar to the first embodiment, and the only difference lies in the position of the germicidal lamp assembly 60.

This embodiment also includes two germicidal lamp assemblies 60, however, instead of being installed in the flow channel of the water inlets 12, the two germicidal lamp assemblies 60 are arranged at the peripheries of the water inlets 12. In this embodiment, two germicidal lamp assemblies 60 are spaced apart, and the two water inlets 12 are located between the two germicidal lamp assemblies 60. Specifically, both germicidal lamp assemblies 60 are installed on the inner wall of the lower housing 16 facing the upper housing 14. The two germicidal lamp assemblies 60 are adjacent to and facing the bottom of the filter assembly 50, and irradiate the surface of the filter device 50 upward from the bottom of the filter assembly 50.

The specific structures of the housing, filter assembly, germicidal lamp assembly, etc. of this embodiment are the same as those of the above embodiment. For details, please refer to the above-detailed description of the first embodiment, which will not be described again here.

Figure 19:
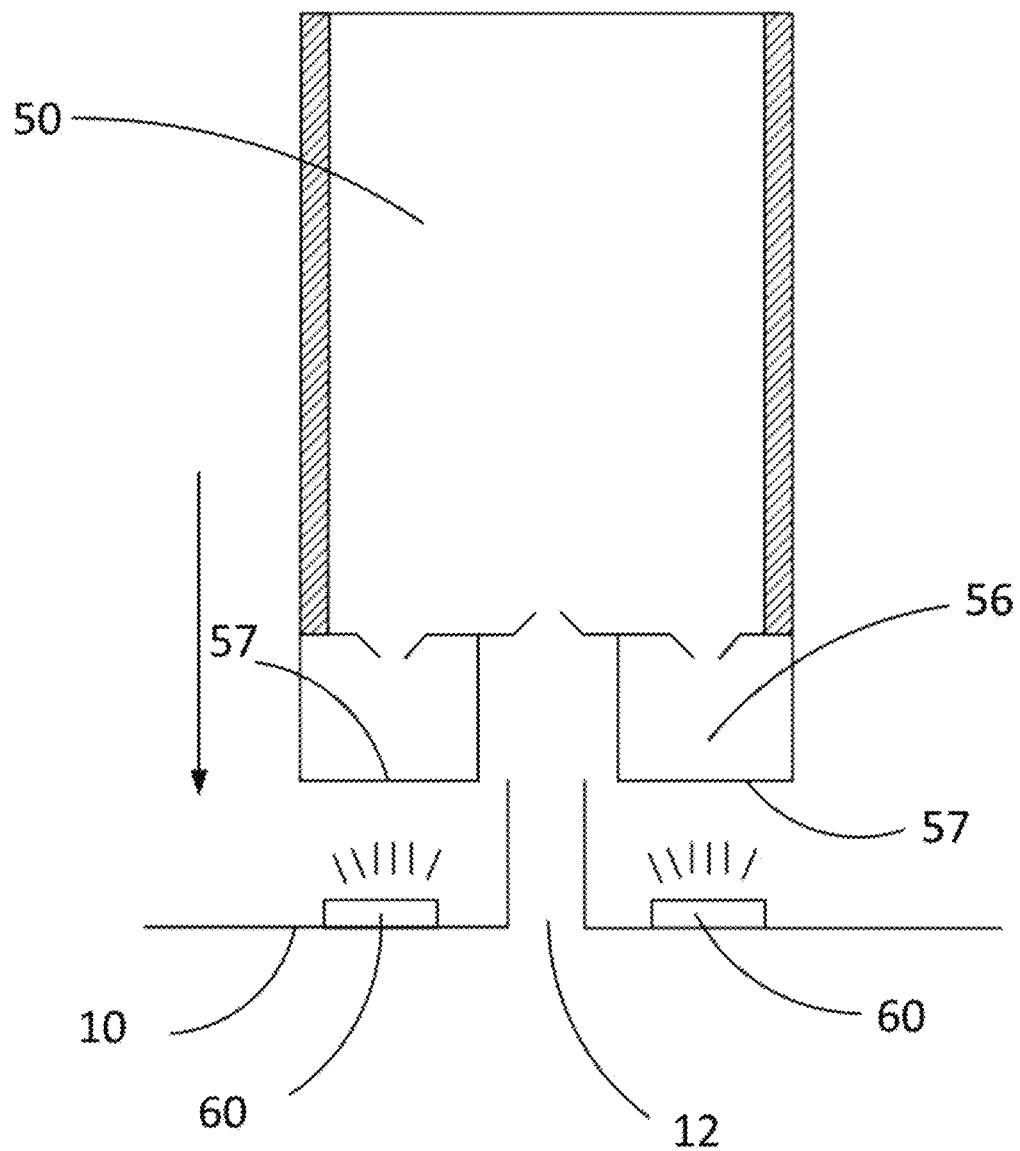
FIG. 19 is an exploded schematic diagram of simplified modules of a pool-cleaning robot according to a fifth embodiment of the present disclosure.

FIG. 19 shows a pool-cleaning robot according to a fifth embodiment of the present disclosure. This embodiment is similar to the fourth embodiment, except for the filter assembly 50.

In this embodiment, the bottom of the filter assembly 50 includes two impurity collection bins 56. The impurities and dirt on the surface of the filter assembly 50 will enter the impurity collection bins 56 from feed ports under the influence of gravity or water. Preferably, bottom walls of the two impurity collection bins 56 are configured as transparent plates 57. Two germicidal lamp assemblies 60 are located on the bottom walls of the two impurity collection bins 56. The ultraviolet light from the germicidal lamp assemblies 60 irradiates upwardly, passes through the impurity collection bins 56, and then irradiates the filter screen or the filter chamber 51.

The specific structures of the housing, germicidal lamp assembly, etc. of this embodiment are the same as those of the above embodiment. For details, please refer to the above-detailed description of the fourth embodiment and the referenced embodiments, which will not be described again here.

Figure 20:
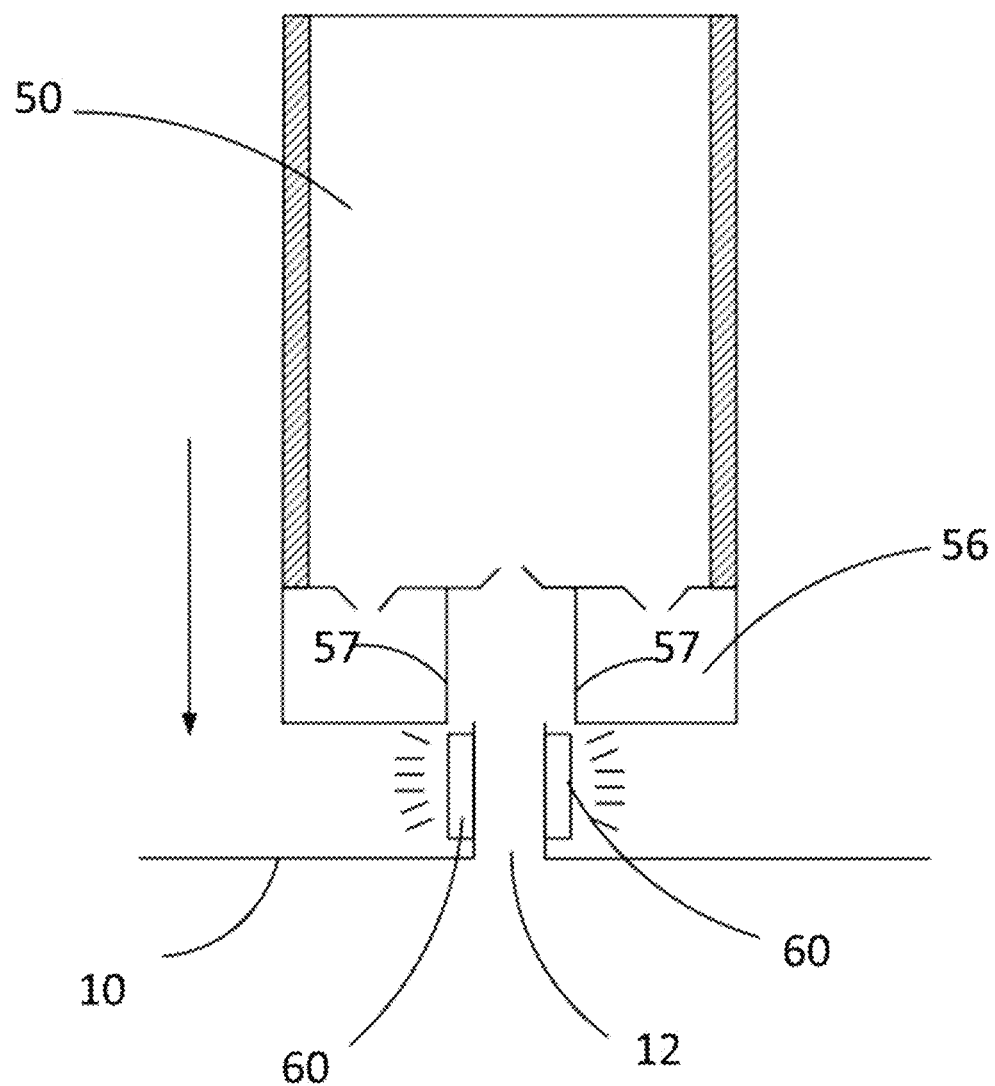
FIG. 20 is an exploded schematic diagram of simplified modules of a pool-cleaning robot according to a sixth embodiment of the present disclosure.

FIG. 20 shows a pool-cleaning robot according to a sixth embodiment of the present disclosure. This embodiment is similar to the fifth embodiment in that the filter assembly also includes two impurity collection bins 56. The difference lies in the location of the germicidal lamp assembly 60.

Specifically, in this embodiment, the two impurity collection bins 56 are spaced apart, and two germicidal lamp assemblies 60 are disposed in the gap between the two impurity collection bins 56. Each germicidal lamp assembly 60 is arranged on the periphery of the corresponding impurity collection chamber 56 and irradiates towards it. The irradiation directions of the two germicidal lamp assemblies 60 are opposite to each other. Preferably, side walls of the impurity collection bins 56 are configured as transparent plates 57.

In other embodiments, to facilitate the dumping of impurities and dirt from the impurity collection bin 56, a more preferred solution is to dispose the germicidal lamp assembly 60 on the inner wall of the lower housing 16. The germicidal lamp assembly 60 directly irradiates the filter screen of the filter assembly 60 and the surface of impurities and dirt through the transparent plates 57, achieving complete germicidal and disinfection.

The specific structures of the housing, filter assembly, germicidal lamp assembly, etc. of this embodiment are the same as those of the above embodiment. For details, please refer to the above-detailed description of the fifth embodiment and its cited embodiments, which will not be described again here.

Figure 21:
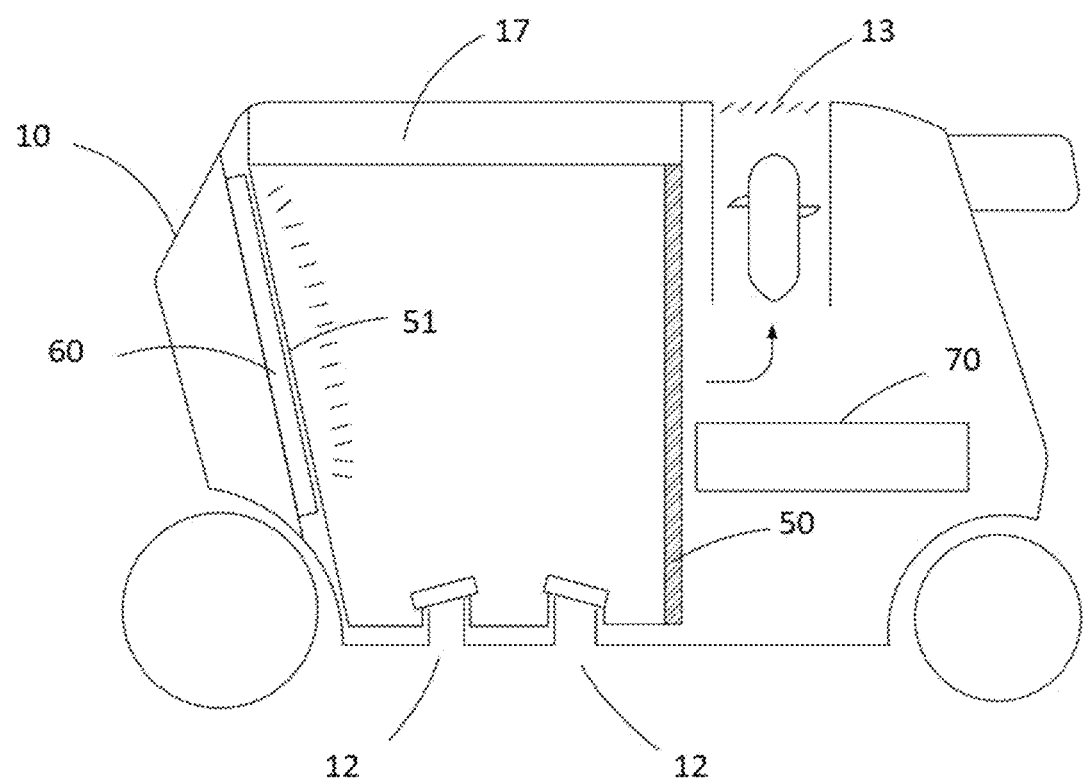
FIG. 21 is a simplified module schematic diagram of a pool-cleaning robot according to a seventh embodiment of the present disclosure.

FIG. 21 shows a pool-cleaning robot according to the seventh embodiment of the present disclosure. This embodiment is similar to the second embodiment, except that the position of the germicidal lamp assembly 60 is different.

In this embodiment, the germicidal lamp assembly 60 is arranged on the inner surface of the side wall of the housing 10. The germicidal lamp assembly 60 is adjacent to and directly opposite to the side wall 54 of the filter assembly 50. The germicidal lamp assembly 60 directly irradiates the side wall of the filter assembly 50.

The specific structures of the housing, filter assembly, germicidal lamp assembly, etc. of this embodiment are the same as those of the first embodiment or the second embodiment. For details, please refer to the above-detailed description of the second embodiment, which will not be described again here.

Figure 22:
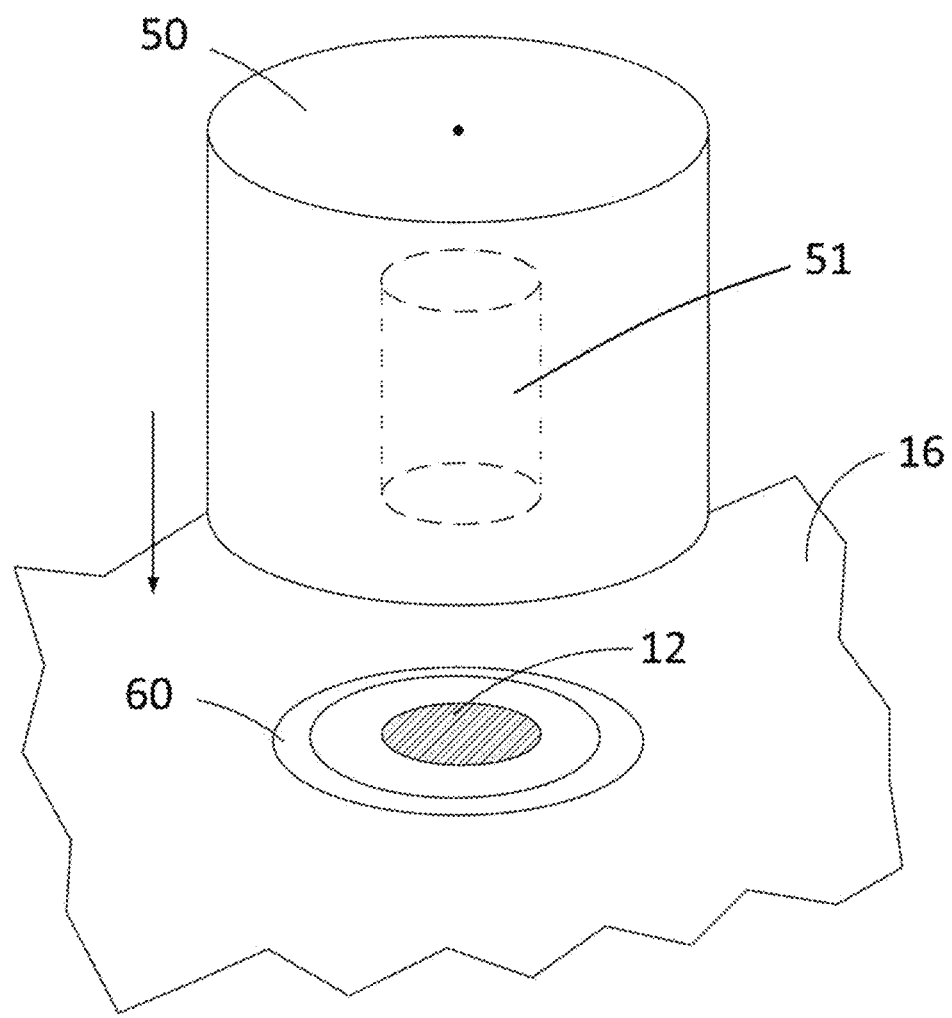
FIG. 22 is an exploded schematic diagram of simplified modules of a pool-cleaning robot according to an eighth embodiment of the present disclosure.
Figure 23:
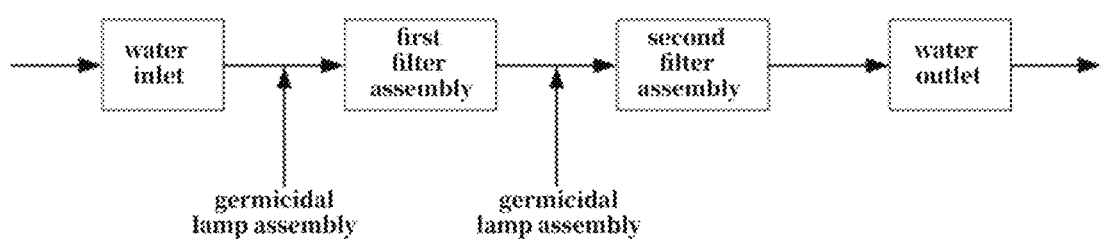
FIG. 23 is a simplified module schematic diagram of a pool-cleaning robot according to a ninth embodiment of the present disclosure.

FIG. 22 shows a pool-cleaning robot according to the eighth embodiment of the present disclosure. This embodiment is similar to the first embodiment, except for the filter assembly 50 and the germicidal lamp assembly 60.

In this embodiment, the filter assembly 50 employs a filter element as the filter component, specifically a cylindrical filter element. The water inlet of the housing 10 is circular, and the bottom of the filter assembly 50 is attached to the water inlet 12. Preferably, the filter assembly 50 has an inner chamber 51 at the center of the bottom with a bottom opening facing the water inlet 12. Under the action of the pump assembly, the water enters the inner chamber 51 of the filter assembly 50 from the water inlet 12 and is discharged from the surrounding filter element materials to the water outlet 13. In this embodiment, the germicidal lamp assembly 60 is arranged on the inner wall of the lower housing 16, facing the bottom of the filter assembly 50. The germicidal lamp assembly 60 may be a circular germicidal lamp tube. The circular germicidal lamp tube surrounds the periphery of the water inlet 12 and directly radiates the bottom of the filter assembly 50.

In other embodiments, the germicidal lamp assembly 60 may also be disposed on the top of the filter assembly 50, specifically on the inner wall of the top cover, opposite to the top of the filter assembly 50, and the germicidal lamp assembly 60 directly irradiates the top of the filter assembly.

As an alternative solution, the germicidal lamp assembly 60 may also be disposed on the inner wall of the flow channel, comprising a plurality of germicidal lamp assemblies spaced apart and evenly distributed along the radial direction of the filtration assembly 50, with the germicidal light directly irradiating the sidewalls of the filtration assembly 50.

It can be understood that in other embodiments, instead of forming an inner chamber in the filter element of the filter assembly 50, the bottom of which is attached and conforms to the water inlet 12. Under the action of the pump, the water flows into the filter element of the filter assembly 50 from the water inlet 12 and is discharged from the surrounding filter material. At this time, the entire interior of the cylindrical filter element may be taken as a filter chamber filled with filter element material.

The specific structures of the housing, germicidal lamp assembly, etc. of this embodiment are the same as those of the first embodiment or the second embodiment. For details, please refer to the above-detailed description of the first embodiment, which will not be described again here.

FIG. 22 shows a pool-cleaning robot according to the ninth embodiment of the present disclosure. This embodiment is similar to the first embodiment, except that this embodiment includes multiple filter assemblies 50, and there may be one or more germicidal lamp assemblies 60.

When the number of the germicidal lamp assemblies 60 is one, it may be arranged adjacent to any one of the filter assemblies 50, either at the water inlet or in the flow channel upstream of the filter assembly 50. When there are multiple germicidal lamp assemblies 60, they may be disposed separately corresponding to each of the filter assemblies 50, or they may be disposed in the flow channel upstream of the corresponding filter assemblies 50.

The specific structures of the housing, filter assembly, germicidal lamp assembly, etc. of this embodiment are the same as those of the first embodiment or the second embodiment. For details, please refer to the above-detailed description of the first embodiment and will not be repeated here.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A pool-cleaning robot, comprising:
    a housing, defining a receiving chamber therein and a water inlet and a water outlet which are fluidly communicated with one another;
    a power assembly, connected to the housing and configured to provide power to drive the pool-cleaning robot to travel in a pool;
    a filter assembly, arranged in the receiving chamber and having a filter chamber that is in fluid communication with the water inlet and the water outlet;
    a pump assembly, arranged in the receiving chamber and configured to drive the water flowing into the receiving chamber from the water inlet and then out from the water outlet after being filtered by the filter assembly; and
    a germicidal lamp assembly installed in the housing,
    wherein the housing comprises an upper housing and a lower housing connected one another, the lower housing comprises a bottom wall and a peripheral wall extending from the bottom wall toward and connecting with the upper housing;
    wherein the water inlet is defined on the bottom wall of the lower housing and extends therethrough, the water inlet is in an elongated strip shape and defined by two elongated sidewalls on the bottom wall, the two elongated sidewalls are parallel to each other and spaced apart; and
    wherein the germicidal lamp assembly is in an elongated strip shape disposed at one of the elongated sidewalls and extending therealong, a length of the germicidal lamp assembly is substantially equal to a length of the water inlet for irradiating a flow channel of the water inlet.

2. The pool-cleaning robot according to claim 1, further comprising a second water inlet and a second germicidal lamp assembly, and the two germicidal lamp assemblies are respectively arranged on a corresponding elongated sidewall of the two water inlets, wherein light-emitting directions of the two germicidal lamp assemblies are identical; or the light-emitting directions of the two germicidal lamp assemblies are opposite to each other.

3. The pool-cleaning robot according to claim 2, wherein the filter assembly is a basket filter device, the filter assembly comprises a top plate, a bottom plate and a side wall connecting the top plate and the bottom plate, and the top plate, bottom plate and the side wall together define the filter chamber.

4. The pool-cleaning robot according to claim 3, wherein the filter assembly further comprises a middle partition located in the filter chamber, a top end of the middle partition abuts against the top plate, and a bottom end of the middle partition abuts against the bottom plate.

5. The pool-cleaning robot according to claim 3, wherein the bottom plate of the filter assembly defines two inlets corresponding to the two water inlets which are composed of a main water inlet and an auxiliary water inlet, and the bottom plate further comprises two bottom covers pivotally openable to cover each inlet, when working, the main water inlet is open and the auxiliary water inlet is closed, wherein a bottom cover corresponding to the auxiliary water inlet is provided with a counterweight, when the pool-cleaning robot climbs wall of swimming pool, the bottom cover at the auxiliary water inlet opens under an action of gravity, thereby opening the auxiliary water inlet.

6. The pool-cleaning robot according to claim 3, wherein a top of the upper housing is provided with an opening, a top cover is provided at the opening, a first positioning portion is provided on a surface of the top plate facing the top cover, and a second positioning portion is provided on a surface of the top cover facing the top plate, the first positioning portion and the second positioning portion cooperate with each other to allow for positional alignment of the top plate and the top cover before installation.

7. The pool-cleaning robot according to claim 6, wherein the first positioning portion of the top plate is a first protruding post, and the second positioning portion of the top cover is a second protruding post having a positioning hole, and when the top plate is positionally aligned with the top cover, a tip of the first protruding post is engaged in the positioning hole of the second protruding post.

8. The pool-cleaning robot according to claim 1, wherein a reflective material facing a light-emitting surface of the germicidal lamp assembly is provided on another one of the elongated sidewalls to prevent aging of the housing.

9. The pool-cleaning robot according to claim 1, wherein the germicidal lamp assembly comprises a light source module, a heat-dissipating seat and a lamp cover, the light source module is attached to a first side of the heat-dissipating seat, the lamp cover is connected to the first side of the heat-dissipating seat and encloses the light source module therein.

10. The pool-cleaning robot according to claim 9, wherein the heat-dissipating seat comprises a base and a plurality of heat-dissipating fins, the base has opposite first and second sides, and the light source module is disposed on the first side of the base, and the plurality of heat-dissipating fins are disposed on the second side of the base.

11. The pool-cleaning robot according to claim 10, wherein a plurality of slits are defined on a perimeter of the lamp cover to cause outward expansion of the lamp cover during assembly, thereby allowing it to be conveniently mounted around an outer periphery of the base.

12. The pool-cleaning robot according to claim 10, wherein the light source module comprises a substrate attached to a lower surface of the base and a plurality of lamp beads disposed on the substrate, the plurality of lamp beads is disposed on a side of the substrate facing away from the base, a connecting surface between the substrate and the base is coated with thermal conductive paste.

13. The pool-cleaning robot according to claim 10, wherein an inner wall of the water inlet of the housing defines a slot, and an end of a side wall of the lamp cover of the germicidal lamp assembly is provided with a hook, which protrudes from the heat-dissipating seat and is engaged in the slot of the housing, thereby allowing the germicidal lamp assembly to be securely mounted within the flow channel of the water inlet, and wherein an inner wall of the housing further defines a groove, when the germicidal lamp assembly is snapped onto the housing, the plurality of heat-dissipating fins protruding from the germicidal lamp assembly are received in the groove of the housing.

14. The pool-cleaning robot according to claim 9, wherein a surface of the first side of the heat-dissipating seat is recessed inwardly to form an accommodation cavity, the light source module is accommodated in the accommodation cavity, and a perimeter of the lamp cover is connected to the heat-dissipating seat in a sealed manner.

15. The pool-cleaning robot according to claim 9, wherein the lamp cover and the heat-dissipating seat are connected through a fastener; or the lamp cover is snapped on a periphery of the heat-dissipating seat.

16. The pool-cleaning robot according to claim 9, wherein a material of a light-transmitting area of the lamp cover corresponding to the light source module is a transparent material, and a light-emitting surface of the lamp cover is provided with a protective film, which covers the transparent material of the lamp cover.

17. The pool-cleaning robot according to claim 16, wherein the lamp cover includes an end wall and a side wall extending from a periphery of the end wall, the light-transmitting area is located at a central portion of the end wall, and the light-transmitting area is concave relative to an outer surface of the end wall.

18. The pool-cleaning robot according to claim 1, further comprising a control device which is respectively electrically connected to the power assembly, the pump assembly and the germicidal lamp assembly, wherein the germicidal lamp assembly further comprises a power supply cable electrically connected to the control device, and the power supply cable is arranged along an inner wall of the housing.

19. A pool-cleaning robot, comprising:
a housing, defining a receiving chamber therein and two water inlets and a water outlet which are fluidly communicated with one another;
a power assembly, connected to the housing and configured to provide power to drive the pool-cleaning robot to travel in a pool;
a filter assembly, arranged in the receiving chamber and having a filter chamber that is in fluid communication with the water inlet and the water outlet;
a pump assembly, arranged in the receiving chamber and configured to drive the water flowing into the receiving chamber from the water inlet and then out from the water outlet after being filtered by the filter assembly; and two germicidal lamp assemblies installed in the housing,
wherein the housing comprises an upper housing and a lower housing connected one another, the lower housing comprises a bottom wall and a peripheral wall extending from the bottom wall toward and connecting with the upper housing,
wherein a bottom of the filter assembly is provided with two impurity collection bins configured to collect impurities and dirt on a surface of the filter assembly under an action of gravity or water, the two impurity collection bins are spaced apart to define a gap, and two germicidal lamp assemblies are disposed in the gap, each germicidal lamp assembly is arranged at a periphery of, and irradiates towards, the corresponding impurity collection bin, light-emitting directions of the two germicidal lamp assemblies are opposite to each other, and side walls of the impurity collection bins are configured as transparent plates.

20. A pool-cleaning robot, comprising:
a housing, defining a receiving chamber therein and two water inlets and a water outlet which are fluidly communicated with one another;
a power assembly, connected to the housing and configured to provide power to drive the pool-cleaning robot to travel in a pool;
a filter assembly, arranged in the receiving chamber and having a filter chamber that is in fluid communication with the water inlet and the water outlet;
a pump assembly, arranged in the receiving chamber and configured to drive the water flowing into the receiving chamber from the water inlet and then out from the water outlet after being filtered by the filter assembly; and
two germicidal lamp assemblies installed in the housing,
wherein the housing comprises an upper housing and a lower housing connected one another, the lower housing comprises a bottom wall and a peripheral wall extending from the bottom wall toward and connecting with the upper housing;
wherein a bottom of the filter assembly is provided with two impurity collection bins configured to collect impurities and dirt on a surface of the filter assembly under an action of gravity or water, each germicidal lamp assembly is located below a corresponding impurity collection bin, a bottom of each impurity collection bin is provided with a transparent plate, and each germicidal lamp assembly is arranged opposite to a transparent plate to irradiate an interior of corresponding impurity collection bin.

* * * * *